(12) United States Patent
Filser et al.

(10) Patent No.: US 11,016,543 B2
(45) Date of Patent: May 25, 2021

(54) BATTERY-POWERED PLATFORM FOR INTERCHANGEABLE MODULES

(71) Applicant: Moduware PTY LTD, Melbourne (AU)

(72) Inventors: Frank Thomas Filser, Hong Kong (CN); Hubertus Friedrich Wasmer, Oberengstringen (CH); Lech Alexander Murawski, Shenzhen (CN)

(73) Assignee: MODUWARE PTY LTD, Melbourne (AU)

( * ) Notice: Subject to any disclaimer, the term of this patent is extended or adjusted under 35 U.S.C. 154(b) by 1041 days.

(21) Appl. No.: 15/315,730

(22) PCT Filed: Jun. 3, 2015

(86) PCT No.: PCT/CN2015/080715
§ 371 (c)(1),
(2) Date: Dec. 2, 2016

(87) PCT Pub. No.: WO2015/184993
PCT Pub. Date: Dec. 10, 2015

(65) Prior Publication Data
US 2017/0090530 A1    Mar. 30, 2017

Related U.S. Application Data

(60) Provisional application No. 62/150,856, filed on Apr. 22, 2015, provisional application No. 62/141,869,
(Continued)

(51) Int. Cl.
*G06F 1/18*    (2006.01)
*H02J 7/00*    (2006.01)
(Continued)

(52) U.S. Cl.
CPC ............ *G06F 1/189* (2013.01); *G06F 1/1632* (2013.01); *G06F 1/1635* (2013.01); *G06F 1/263* (2013.01);
(Continued)

(58) Field of Classification Search
CPC ...... G06F 1/189; G06F 1/1632; G06F 1/1635; G06F 1/263; H02J 7/342; H02J 7/0027; H02J 7/0042; H02J 7/0045
(Continued)

(56) References Cited

U.S. PATENT DOCUMENTS

| | | | | |
|---|---|---|---|---|
| 4,310,770 A | * | 1/1982 | Keener | ..................... H02J 3/14 307/35 |
| 5,167,024 A | * | 11/1992 | Smith | ................... H02J 7/0063 713/322 |

(Continued)

FOREIGN PATENT DOCUMENTS

| | | |
|---|---|---|
| CN | 1263292 A | 8/2000 |
| CN | 201893486 U | 7/2011 |

(Continued)

OTHER PUBLICATIONS

Devicefidelity, Inc. "In2Pay iCaisse4X NFC", Nov. 3, 2012.
(Continued)

*Primary Examiner* — Paul R. Myers
(74) *Attorney, Agent, or Firm* — David D. Brush; Westman, Champlin & Koehler, P.A.

(57) ABSTRACT

A module receiving cradle (12) includes a frame (16), a power source (34) disposed within the frame (16), at least one external port (26), a backbone (18) disposed at the frame (16), in which the backbone (18) provides a plurality of module connectors (24) configured to connect to at least one module (14). The battery pack also includes a plurality of docking spaces (22) disposed adjacent to the backbone (18)
(Continued)

and the module connectors (24). A control unit (32) with a memory is disposed within the frame (16) and configured to process data between the memory and the module (14). The module receiving cradle (12) is configured to route the power from the power source (34) and optionally from any connected predetermined module (14) to the external electronic product through at least one external port (26).

17 Claims, 16 Drawing Sheets

Related U.S. Application Data filed on Apr. 2, 2015, provisional application No. 62/007,407, filed on Jun. 4, 2014.

(51) Int. Cl.
*G06F 1/26* (2006.01)
*H02J 7/34* (2006.01)
*G06F 1/16* (2006.01)

(52) U.S. Cl.
CPC .......... *H02J 7/0027* (2013.01); *H02J 7/0042* (2013.01); *H02J 7/0045* (2013.01); *H02J 7/342* (2020.01); *H02J 2207/30* (2020.01)

(58) Field of Classification Search
USPC .......................................... 710/110, 301–304
See application file for complete search history.

(56) References Cited

U.S. PATENT DOCUMENTS

| | | | |
|---|---|---|---|
| 5,499,377 A * | 3/1996 | Lee | G06F 3/023 340/2.4 |
| 5,608,608 A * | 3/1997 | Flint | G06F 1/183 361/679.32 |
| 5,638,521 A * | 6/1997 | Buchala | G06F 3/1284 710/316 |
| 5,841,424 A * | 11/1998 | Kikinis | G06F 3/021 345/168 |
| 5,884,049 A * | 3/1999 | Atkinson | G06F 1/1632 361/679.41 |
| 6,061,746 A * | 5/2000 | Stanley | G06F 13/387 710/10 |
| 6,286,060 B1 * | 9/2001 | DiGiorgio | G06F 13/385 710/300 |
| 6,308,239 B1 * | 10/2001 | Osakada | G06F 13/4022 710/305 |
| 6,557,049 B1 * | 4/2003 | Maloy | G06F 1/181 709/221 |
| 6,668,296 B1 * | 12/2003 | Dougherty | G06F 1/1632 710/303 |
| 6,697,892 B1 * | 2/2004 | Laity | G06F 13/385 710/314 |
| 6,717,801 B1 | 4/2004 | Castell et al. | |
| 6,779,072 B1 * | 8/2004 | Sauder | G06F 12/06 711/1 |
| 6,839,856 B1 * | 1/2005 | Fromm | G06F 13/124 365/220 |
| 6,888,338 B1 * | 5/2005 | Popescu-Stanesti | G06F 1/1632 320/137 |
| 6,898,076 B2 * | 5/2005 | Pappalardo | G06F 1/1626 361/679.41 |
| 6,900,980 B2 * | 5/2005 | Christopher | G06F 1/1632 361/679.31 |
| 6,920,338 B2 | 7/2005 | Engstrom et al. | |
| 7,073,010 B2 * | 7/2006 | Chen | G06F 13/385 710/313 |
| 7,099,984 B2 * | 8/2006 | Watkins | G06F 9/4812 710/260 |
| 7,114,017 B2 * | 9/2006 | Parrish | G06F 13/4022 710/313 |
| 7,412,548 B2 * | 8/2008 | Sichner | G05B 19/054 710/10 |
| 7,478,191 B2 * | 1/2009 | Wurzburg | G06F 13/4022 710/17 |
| 7,478,251 B1 * | 1/2009 | Diab | G06F 1/189 713/300 |
| 7,480,753 B2 * | 1/2009 | Bohm | G06F 13/4022 710/104 |
| 7,487,283 B2 * | 2/2009 | Sivertsen | G06F 13/409 710/301 |
| 7,539,808 B2 * | 5/2009 | Kojima | G06F 1/266 710/302 |
| 7,746,629 B2 * | 6/2010 | Assouad | G06F 1/1632 361/679.31 |
| 7,941,197 B2 | 5/2011 | Jain et al. | |
| 8,447,890 B1 | 5/2013 | LeTourneur et al. | |
| 8,478,921 B2 * | 7/2013 | Matthews | H04W 52/0283 710/110 |
| 9,817,788 B2 * | 11/2017 | Ho | G06F 13/4063 |
| 2004/0019732 A1 | 1/2004 | Overtoom et al. | |
| 2004/0202858 A1 | 10/2004 | Lee | |
| 2005/0102462 A1 * | 5/2005 | Choi | G06F 3/14 710/313 |
| 2005/0286212 A1 | 12/2005 | Brignone et al. | |
| 2006/0227759 A1 * | 10/2006 | Bohm | G06F 13/4022 370/351 |
| 2007/0242608 A1 * | 10/2007 | Ou | H04L 45/12 370/238 |
| 2008/0060031 A1 | 3/2008 | Sekigawa | |
| 2008/0123287 A1 | 5/2008 | Rossell et al. | |
| 2009/0231801 A1 * | 9/2009 | Cummins | G06F 1/1632 361/679.41 |
| 2010/0022277 A1 | 1/2010 | An et al. | |
| 2010/0077126 A1 | 3/2010 | Huang et al. | |
| 2010/0078343 A1 | 4/2010 | Hoellwarth et al. | |
| 2010/0220435 A1 | 9/2010 | Fahey et al. | |
| 2012/0281356 A1 | 11/2012 | Brewer et al. | |
| 2012/0282977 A1 | 11/2012 | Haleluk | |
| 2014/0331009 A1 * | 11/2014 | Parsonese | G06F 21/80 711/115 |
| 2015/0133204 A1 | 5/2015 | Ivanovski et al. | |

FOREIGN PATENT DOCUMENTS

| | | |
|---|---|---|
| CN | 202444525 U | 9/2012 |
| CN | 203086527 U | 7/2013 |
| CN | 203193367 U | 9/2013 |
| EP | 1381205 A1 | 1/2004 |
| KR | 20080013536 A | 2/2008 |

OTHER PUBLICATIONS

Adevicefidelity, Inc., "In2Pay iCaisse", Nov. 3, 2012.
Charlie Corry, "iExpander—an expansion device for your iPhone", Sep. 11, 2012.
Tomas Ratas, "Mophie Juice Pack—iPhone 3G", Dec. 9, 2008.

* cited by examiner

| Power Output Priority \ Power Input Priority | Charge the internal battery of the portable device till 10% | charge the internal battery of the super hub system until 100mAh | Any electronic product that is connected to the super hub system | Charge the internal battery of the portable device till 100% | charge the internal battery of the super hub system until 100% | Charge the battery module connected to the modules docking hub till 100% |
|---|---|---|---|---|---|---|
| 1 Power supply | 1 | 2 | 3 | 4 | 5 | 6 |
| 2 Master electronic device | 1 | 2 | 3 | 4 | 5 | 6 |
| 3 Modules docking hub with battery module therein | 1 | 2 | 3 | 4 | -- | -- |
| 4 The internal battery of the super hub system | 1 | -- | 2 | 3 | -- | -- |
| 5 The internal battery of the portable device | -- | 1 | 2 | -- | -- | -- |

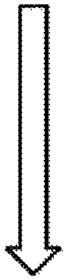

1st

BATTERY-POWERED PLATFORM FOR INTERCHANGEABLE MODULES

CROSS-REFERENCE TO RELATED APPLICATION

This application claims benefit under 35 U.S.C. § 119(e) of U.S. Provisional Application having Ser. No. 62/007,407 filed on Jun. 4, 2014, which is hereby incorporated by reference herein in its entirety. This application also claims priority from the U.S. Provisional Application having Ser. No. 62/141,869 filed on Apr. 2, 2015 and U.S. Provisional Application having Ser. No. 62/150,856 filed on Apr. 22, 2015, which are hereby incorporated by reference herein in its entirety.

FIELD OF THE INVENTION

This invention relates to a device for storing electric power and optionally data and/or module and routing the electric power and optionally the data, and in particular a device for storing electric power and optionally data and/or at least one module and routing the electric power and optionally the data with a platform for interchangeable modules and power bank and/or data exchange with external electronic products.

BACKGROUND ART

In general, an electronic product, due to the hardware included therein and the limitation of the included hardware, is limited to perform its original designed function(s). One would need to have different separate electronic products, that each only performs its originally designed function(s), to fulfill one's different needs. Managing and handling different separate electronic products is inefficient and can cause a lot of inconvenience, especially at outdoor.

SUMMARY OF THE INVENTION

In the light of the foregoing background, it is an object of the present invention to provide a platform for users to bundle different hardware as a single unit according to their own needs. In one implementation, the present invention can be realized as a standalone device with internal battery and a control unit for electric power and optionally data storage. The device further includes at least a space to accommodate and interact with different modules to perform different functions. Different modules include different hardware/electronics to perform different functions. The modules can further supply power and/or communicate with other external electronic products.

Accordingly, the present invention, in one aspect, is a device for storing and routing electric power and optionally data to at least one party, includes a frame; a power source integrated within the frame; at least one first external port disposed at the frame and configured to connect to an external electronic product to transfer power and/or data; a backbone disposed at the frame, wherein the backbone includes a plurality of module connectors configured to connect to at least one module; a plurality of docking spaces disposed adjacent to the backbone, wherein each docking space is disposed adjacent to one of the module connectors; and a control unit disposed within the frame, drawing electric power from the power source, and connected to the first external port and the module connectors, wherein at least one party includes the external product and at least one module, wherein the control unit includes a non-transitional computer readable medium, wherein the control unit is configured to process data between the non-transitional computer readable medium and the module and wherein the device is configured to route the power from the power source and optionally from any connected predetermined module to the external electronic product through at least one external port.

In one embodiment, the device further includes a wireless communication module disposed within the frame and connected to the control unit through an internal port and configured to further provide wireless data communication with the external electronic product and/or the module.

In yet another embodiment, a first version super hub system is coupled to the at least one first external port and an internal port; the internal port further coupling to the plurality of module connectors through the control unit, wherein the first version super hub system selectively choosing one of the at least one first external ports or the internal port as master.

In yet another embodiment, further includes a second version super hub system coupled to the at least one first external port and an internal port; the internal port further coupling to the plurality of module connectors through the control unit, wherein the second version super hub system individually detects a master/slave status of the at least one first external port and the internal port and perform self-configuration to match the master/slave status of each the port.

There are many advantages to the present invention. The device of the present invention can be enhanced to independently and long-lastingly perform additional functions while acting as a battery bank. In addition, the device of the current invention has the added function of accepting modules uniquely and specifically designed to couple and sync with the external electronic products according to the user's settings. These modules can be exchanged or replaced by other modules with different functions, resulting in unprecedented flexibility and customizability. Various modules can communicate with each other and can even be configured to work together to create synergy and perform a function far more complex than the sum of what the respective modules alone can do when combined. For example, the modules can have their own processors to perform a predetermined function and they can be utilized by the electronic communication device to perform different tasks and hence the overall processing capability increases.

Another advantage of the present invention is that the modules can be equipped with different sensors that are able to capture various data from their surroundings. The data collected can be used for subsequent analysis and sharing.

Furthermore, the platform technology disclosed in the present invention can accommodate different hardware modules as long as they conform to a specific form-factor and conform to a common data-communication protocol. Thus different hardware modules can be interchanged freely. As such, the versatility of the whole system can be greatly improved.

BRIEF DESCRIPTION OF THE DRAWINGS

FIG. 15 shows a power output priority and power input priority table in accordance with one embodiment of the first version super hub system of the present invention;

DETAILED DESCRIPTION OF EMBODIMENTS

As used herein and in the claims, "comprising" means including the following elements but not excluding others.

Circuits and devices are shown in block diagram form to avoid obscuring the present disclosure. The terms "couple" or "connect" as used herein means connected directly to or connected through one or more intervening components or circuits. The term "power-master" as used herein means a host/master that provides power to other devices. As far as power transfer goes, these other devices are referred to as "power-slave" devices. The term "data-master" as used herein means a host/master that acts as master device commanding and supervising all data transfers for the entire bus. Other devices connecting to the same bus would be data-slave devices, listening to the commands from the data-master before exchange data. Any of the signals provided over various buses described herein may be time-multiplexed with other signals and provided over one or more common buses. The term "bus" includes both wired and wireless communication technologies, and does not depend on the number of devices connected to a communication medium. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather includes within its scope all embodiments defined by the appended claims.

First Embodiment

Figure 1:
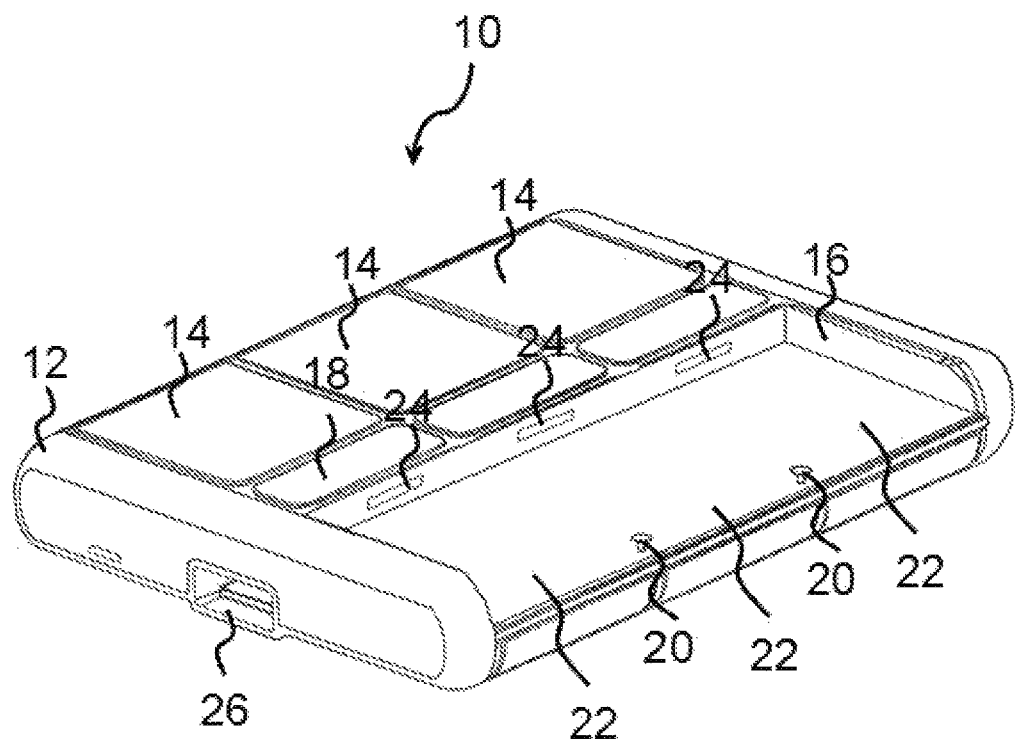
FIG. 1 is a perspective front view of the module docking hub according to a first embodiment of the present invention.
Figure 2:
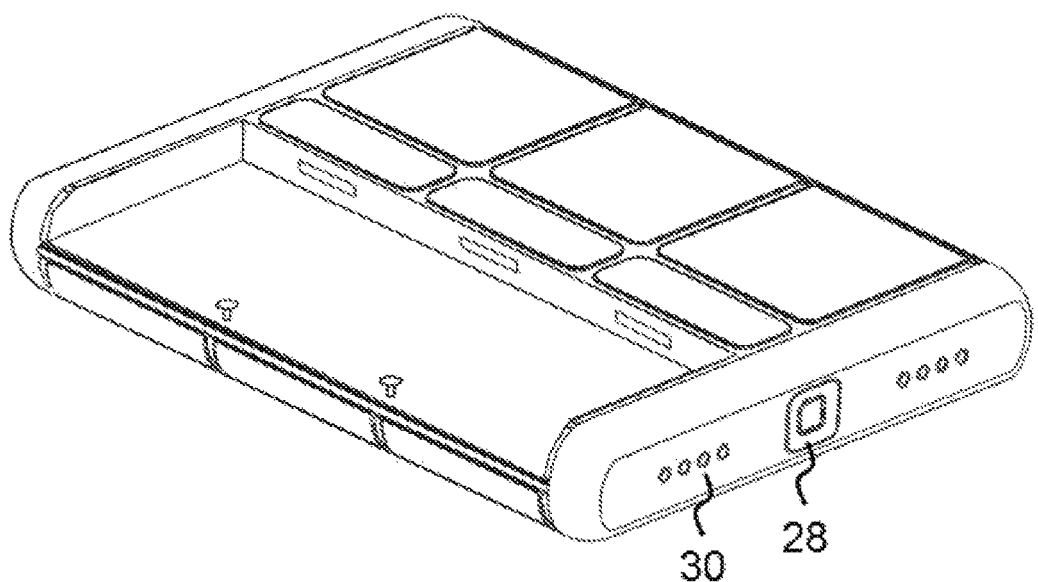
FIG. 2 is a perspective back view of the module docking hub according to the first embodiment of the present invention.

Refer now to FIG. 1 and FIG. 2, the first embodiment of the present invention is a module docking hub 10 including a module receiving cradle 12 (e.g. a device for storing electric power and optionally data and/or module and routing the electric power and optionally the data) and a plurality of modules 14. The module receiving cradle 12 includes a frame 16 having an upper surface and a lower surface, a spine 18 extending at the upper surface from one end of the frame 16 to the opposite end of the frame 16 along the longitudinal axis of the frame 16, a plurality of docking spaces 22 configured to receive the plurality of modules 14 and disposed next to the spine 18, and a battery at the back of the cradle (not shown in FIG. 1 and FIG. 2). In this embodiment, there are total six docking spaces 22. Three docking spaces 22 are at each side of the spine 18 along the longitudinal axis of the frame 16. The module receiving cradle 12 further includes a plurality of locking mechanisms 20 configured to fixingly attach the module at the docking space 22. The locking mechanism 20 is shared by two adjacent docking spaces 22. As shown in FIG. 1, the locking mechanism 20 of this embodiment is a pin with a circular head disposed at the edge of the frame 16 and between two adjacent docking spaces 22. The spine 18 further includes a plurality of module connectors 24 configured to provide power and/or data connection between the module receiving cradle 12 and the modules 14 evenly disposed along the length at each side of the spine 18 along the longitudinal axis of the frame 16. Each docking space 22 has its corresponding module connector 24. Furthermore, the module receiving cradle 12 includes an first external port 26, an on/off switch 28 and a display 30 configured to provide information regarding the status of the module receiving cradle 12 and the attached modules 14. The first external port 26 is configured to transfer at least power and/or data connection between the module receiving cradle 12 with or without the module(s) and any external electronic product (e.g. smartphone, computer, and electronic accessory). External electronic product cannot fit into the docking space 22. The on/off switch 28 is configured to power up the module receiving cradle 12 and the attached modules 14. The display 30 of this embodiment is a plurality of LEDs which use different colors and/or different lighting patterns to indicate the information regarding the status of the module receiving cradle 12 and the attached modules 14 (e.g. power status and operation status). Each of the module connectors 24 and the first external port 26 can be either a universal serial bus (USB) port or a Lighting port from Apple Inc. or pin connector or any other known computer bus.

Figure 3:
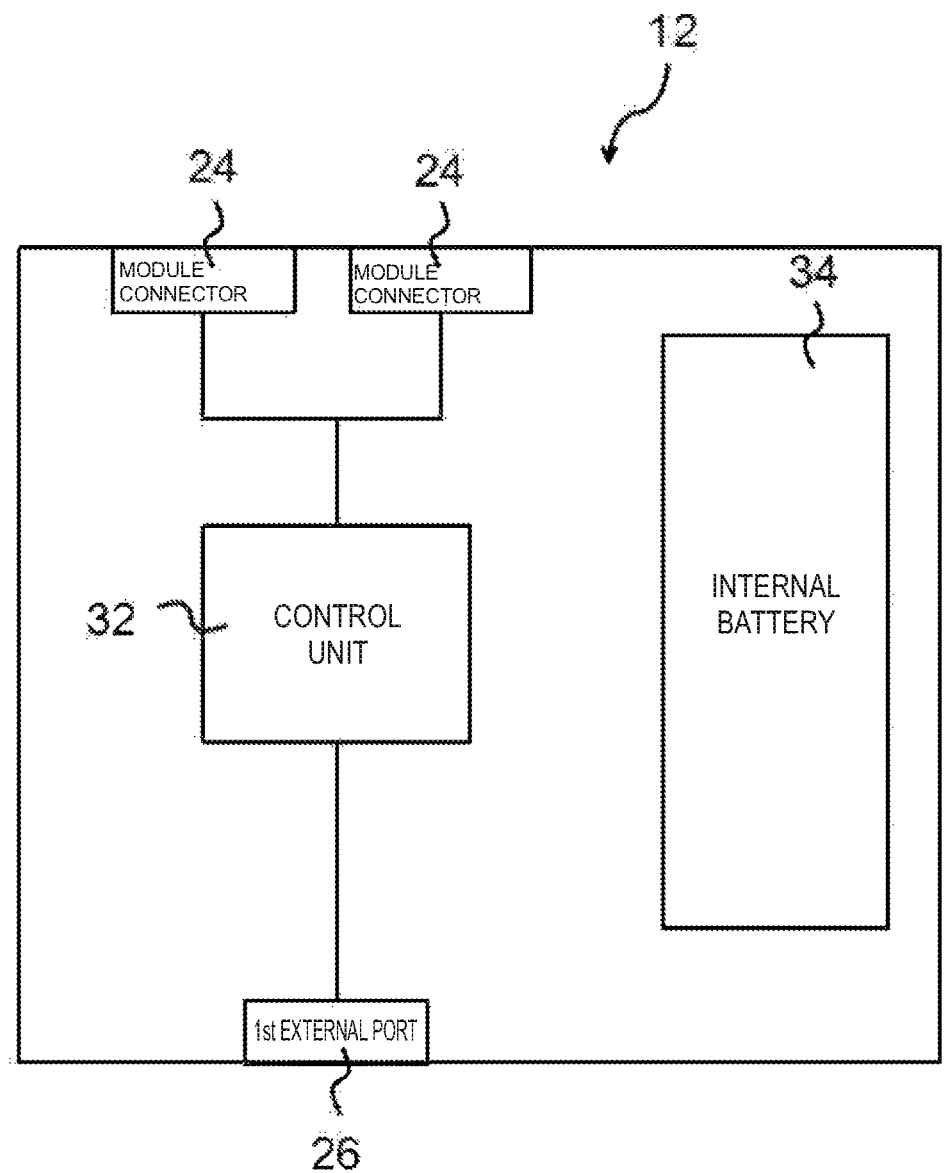
FIG. 3 is a system block diagram of the module receiving cradle according to the first embodiment of the present invention.

FIG. 3 shows an internal block diagram of the module receiving cradle 12 according to the same embodiment of the present invention. The module receiving cradle 12 includes a control unit 32 configured to control all the operations of the module receiving cradle 12 and connected to the module connectors 24, the first external port 26, the display 30 and the on/off switch 28. The control unit 32 further includes a non-transitory computer readable medium to store computer readable codes such that when it is executed by the microprocessor, it gives signals and control all the parts of module receiving cradle 12 to perform and operate. The non-transitory computer readable medium may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms. The computer readable medium may also stores data received from the first external port 26 and the module connectors. An internal battery 34 is also disposed within the frame 16 and configured to provide power to the module receiving cradle 12 itself (including the control unit 32), the attached modules 14, the connected external electronic product and the combination thereof. The internal battery 34 is at least connected to the control unit 32 and can be recharged by power received from the first external port 26 and/or the module connectors. For clarity, the electrical connections between the battery 34 and other devices/circuitry in FIG. 3 are not shown.

Figure 4:
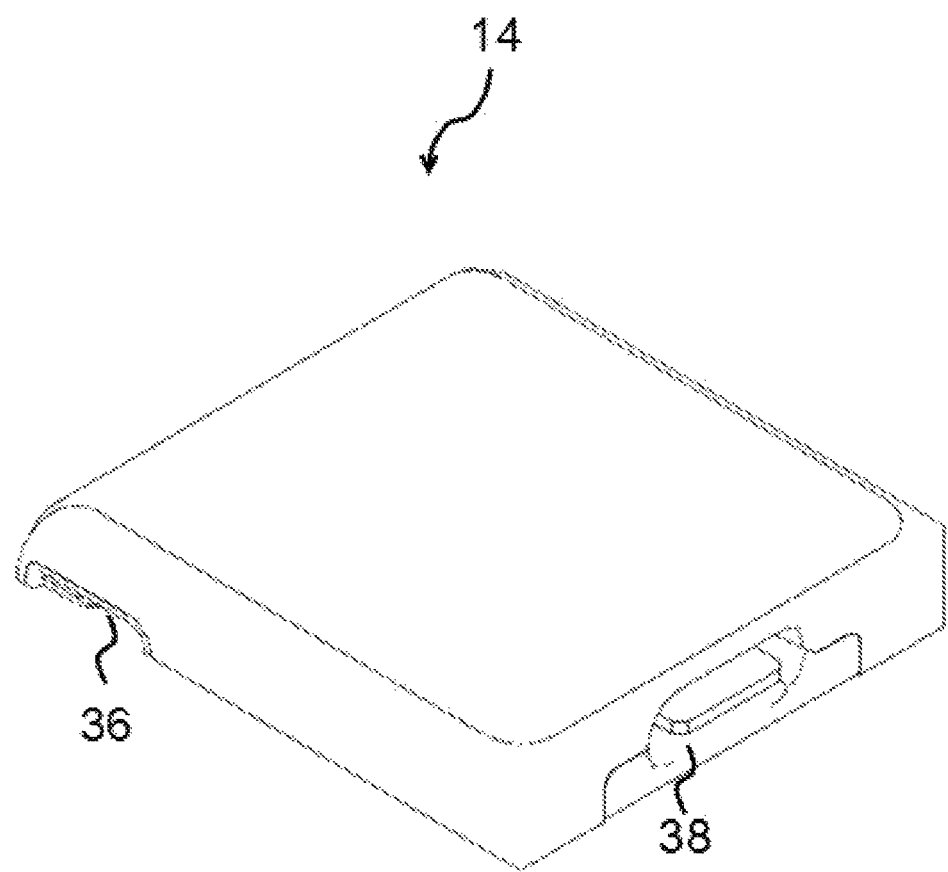
FIG. 4 is a perspective view of the module according to one embodiment of the present invention.

Now refer to FIG. 4, which shows the module 14 of the same embodiment of the present invention. Each of the modules 14 includes a module frame and a cradle connector 38 configured for transferring power and/or data between the module receiving cradle 12 and the module 14. A module locking mechanism 36 is further provided on the module frame configured to engage the locking mechanism 20 on the module receiving cradle 12 for fixingly attaching the module at the docking space 22 on the module receiving cradle 12. In this configuration (i.e. the module is attached to the module receiving cradle 12 at the docking space 22), the cradle connector 38 is connected to the module connector such that power and/or data can be transferred between the module receiving cradle 12 and the module. Further, the module locking mechanism 36 which includes a depression will receive half of the pin of the locking mechanism 20 on the module receiving cradle 12. As such, the module is locked at the docking space 22. The locking mechanism 20 that is shared by two adjacent docking spaces 22 allows two modules 14 to fixingly attach to the module receiving cradle 12 at the two adjacent docking spaces 22 at the same time. In this case, the module locking mechanisms of the two modules 14 share the same pin of the locking mechanism 20.

In one embodiment, the modules 14 have their unique functions and include a module control unit and accessories, which can include, but not limited to either sensor(s), actuator(s), button(s), battery pack(s) or the combination thereof. The cradle connector 38 can be either a universal serial bus (USB) port or a Lighting port from Apple Inc. or pin connector or any other known computer bus. The module control unit further includes a non-transitory computer readable medium to store computer readable codes such that when it is executed by the microprocessor, it gives signals and control all the parts of the module to perform and operate. The non-transitory computer readable medium may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms. The computer readable medium also stores data received from the first external port 26 and the module connectors.

Now turns to the operation of the module docking hub 10 of same embodiment of the present invention. The module receiving cradle 12 can be operated alone to act as a battery bank to provide power to any external product or to charge any compatible rechargeable battery within any external electronic product connected to the external port. The aforesaid can be done by routing the power from the battery 34 to the external electronic product through the first external port 26. Further, the module receiving cradle 12 can work as the module docking hub 10 as a whole to provide extra function by adding at least one module to the module receiving cradle 12. The extra function can be provided by operating the module receiving cradle 12 and the module synergistically. Depending on the accessories in the attached module, different extra functions can be provided. For example, if a module with a battery is attached to the module receiving cradle 12 and connected to the module connector 24, the module docking hub 10 can become a high capacity battery bank. In this case, the power from the internal battery 34 and optionally the power in the battery within the module will be routed to any external electronic product through the first external port 26. The power supplied to the external electronic product can be used to provide power to any external product or to charge any compatible rechargeable battery within any external electronic product. All the power routing is controlled by the control unit 32. In yet another example, the module added to the module receiving cradle 12 can include an air pollution sensor. The internal battery 34 of the module receiving cradle 12 provides power to the module to measure the air pollution for every predetermined period. Every measurement datum of the air pollution can be stored within the module or transferred to the module receiving cradle 12 for storage at the control unit 32. The data can be transferred to any external electronic product for further analysis when they are connected to the first external port 26. Further data received from the external port can be transferred to any connected modules for further processing. Since there are multiple module docking spaces 22 on the module receiving cradle 12 the module docking hub 10 can provide multiple extra functions by adding different modules 14 to the module receiving cradle 12. In yet another example, the module docking hub 10 can provide air pollution measuring function and high capacity battery bank function if the module with air pollution sensor and the module with the battery pack are added to the module receiving cradle 12 at the same time. It is noted that the examples listed above are for illustration only, hence this invention should not be construed as limited to the examples set forth herein. Functions other than the functions as disclosed in the examples above can be added to the module receiving cradle 12. In certain case, the module connected to the module receiving cradle 12 and the module receiving cradle 12 itself can be powered by an external power source connected to the module receiving cradle 12 through the first external port 26. The power from the external power source can be routed to the connected module, the control unit 32, the battery 34 and other parts of the module receiving cradle 12. The module receiving cradle 12, the control unit 32, the battery 34, the connected module with the battery pack and/or the connected module with any particular function can be charged and/or powered.

Second Embodiment

Figure 5:
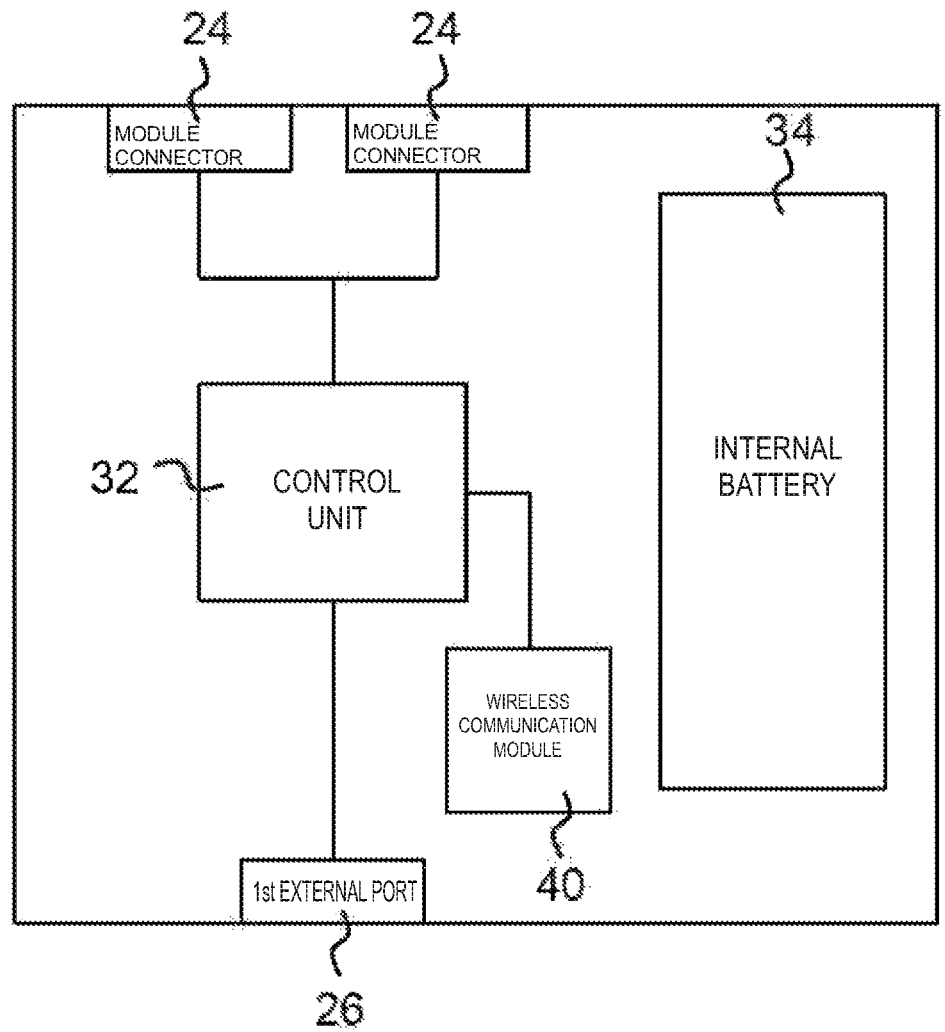
FIG. 5 is a system block diagram of the module receiving cradle according to a second embodiment of the present invention.

Now refer to the module docking hub 10 according to a second embodiment of the present invention. As shown in FIG. 5, the module docking hub 10 of the second embodiment is the same as the module docking hub 10 of the first embodiment disclosed above except the module receiving cradle 12 of the module docking hub 10 of the second embodiment further includes a wireless communication module 40 connected to the control unit 32 through an internal port (not shown). The wireless communication module 40 can provide wireless data communication with other external electronic product through Wi-Fi, Bluetooth, or other wireless communication means and the combination thereof.

Now turns to the operation of the module docking hub 10 of same embodiment of the present invention. The module docking hub 10 of the second embodiment operates as same as the module docking hub 10 of the first embodiment disclosed above except it has an option to stream the data between the module(s) and any external electronic product through the wireless communication module 40 instead of only transferring data between any external electronic product and the modules when they are connected to the first external port 26. Further, the module docking hub 10 of this embodiment can alternatively store the data obtained from the module or external electronic product within itself at the module receiving cradle 12 for storage at the control unit 32. The data can be then transferred to any external electronic product or cloud storage through internet when the module docking hub 10 or the module receiving cradle 12 is connected to the internet itself through its wireless communication module. Further, a smart device (e.g. smartphone, tablet, personal computer) can give instructions to the module docking hub 10 of this embodiment through wireless connection.

Third Embodiment

Figure 6:
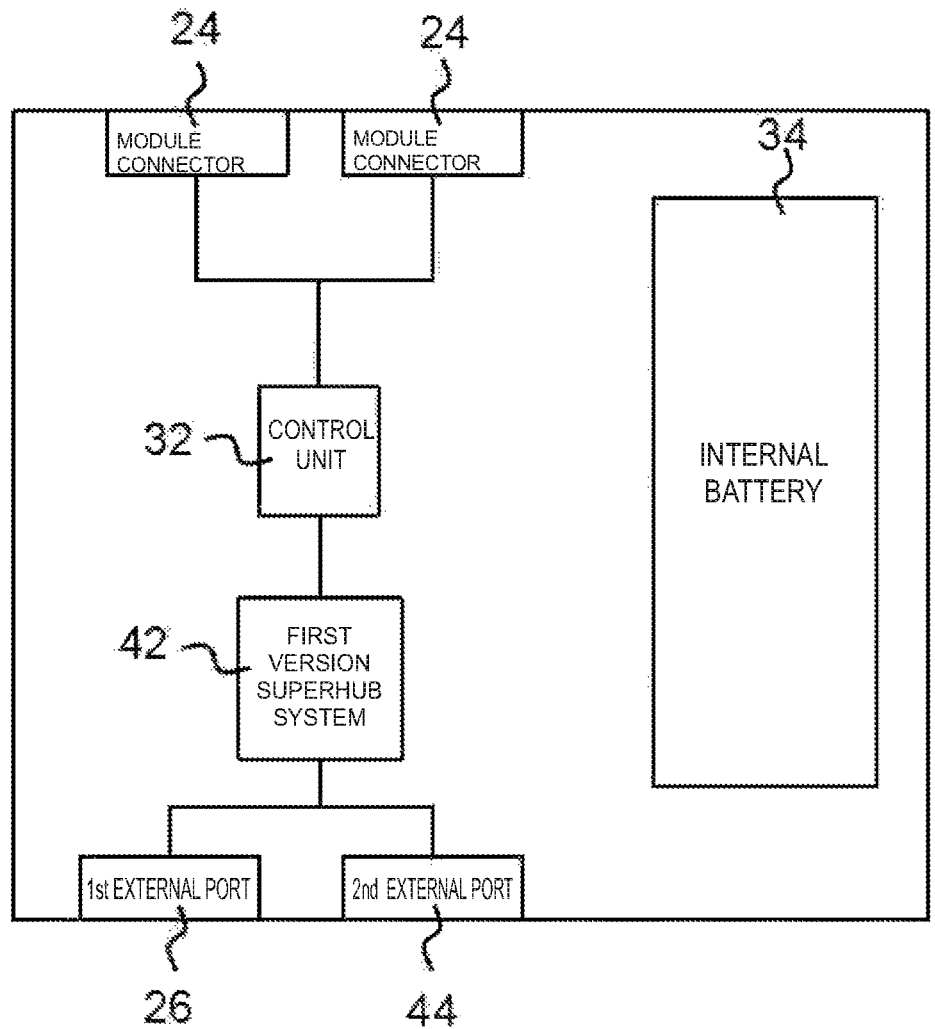
FIG. 6 is a system block diagram of the module receiving cradle according to a third embodiment of the present invention.
Figure 7:
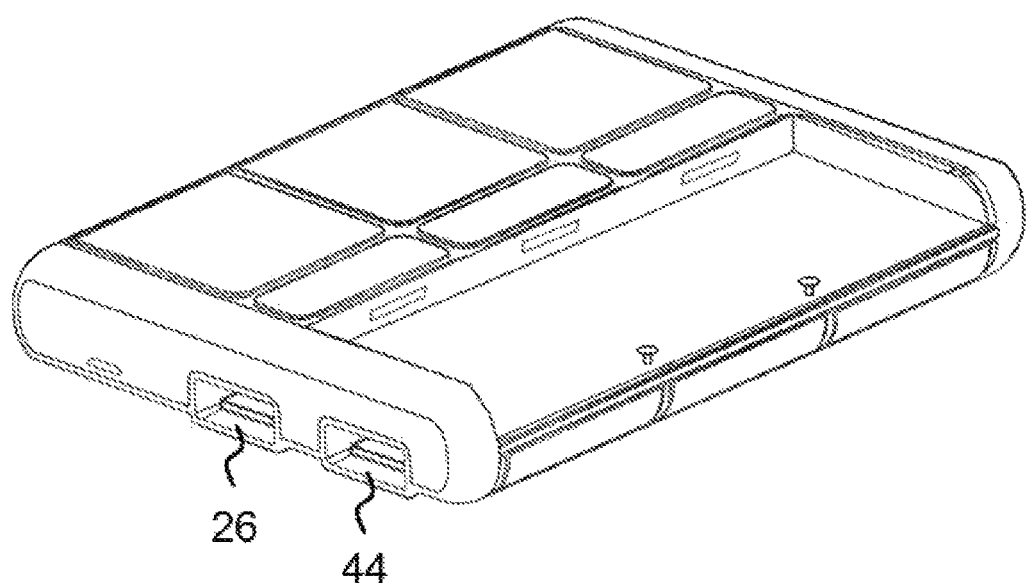
FIG. 7 is a perspective front view of the module docking hub according to the third embodiment of the present invention.

Now refer to the module docking hub 10 according to a third embodiment of the present invention. The module docking hub 10 of the third embodiment is the same as the module docking hub 10 of the first embodiment disclosed above except a first version super hub system 42 (as described below) is included into the module receiving cradle 12 as shown in FIG. 6. The module receiving cradle 12 of this embodiment further includes a second external port 44 as show in FIG. 7, which can be either a universal serial bus (USB) port or a Lighting port from Apple Inc. or pin connector or any other known computer bus. The first version super hub system 42 is connected to the first external port 26, the second external port 44 and an internal port (not shown), which is disposed between the first version super hub system 42 and the control unit 32.

Now turns to the operation of the module docking hub 10 of same embodiment of the present invention. The module docking hub 10 of the third embodiment operates as same as the module docking hub 10 of the first embodiment disclosed above except the first version super hub system 42 of the module receiving cradle 12 act as a power routing and optionally data communication hub between the first external port 26, second external port 44 and the internal port. The power (from the battery 34 and optionally from the battery within a module (if any of such module is attached to the module receiving cradle 12 and connected to the module connector 24)) can be routed from the internal port to the first external port 26 and second external port 44 through the first version super hub system 42. The power routed to the first external port 26 and/or the second external port 44 can be used to provide power to the external electronic product and/or charge any compatible rechargeable battery to any external product connected to the external port(s). Briefly, the first version super hub system 42 facilitates power routing and optionally data communications by choosing intelligently which port acts as master and which port acts as slave. This can be realized by allowing the electronic products to be plugged into any ports of the system of the present invention without worrying which electronic product should be acted as master and which electronic product(s) should be acted as slave(s). The system of the present invention will intelligently assign a port as master and assign the remaining ports as slave. The detail operations of the first version super hub system 42 are described under the first version super hub system 42 section as stated below.

Fourth Embodiment

Figure 8:
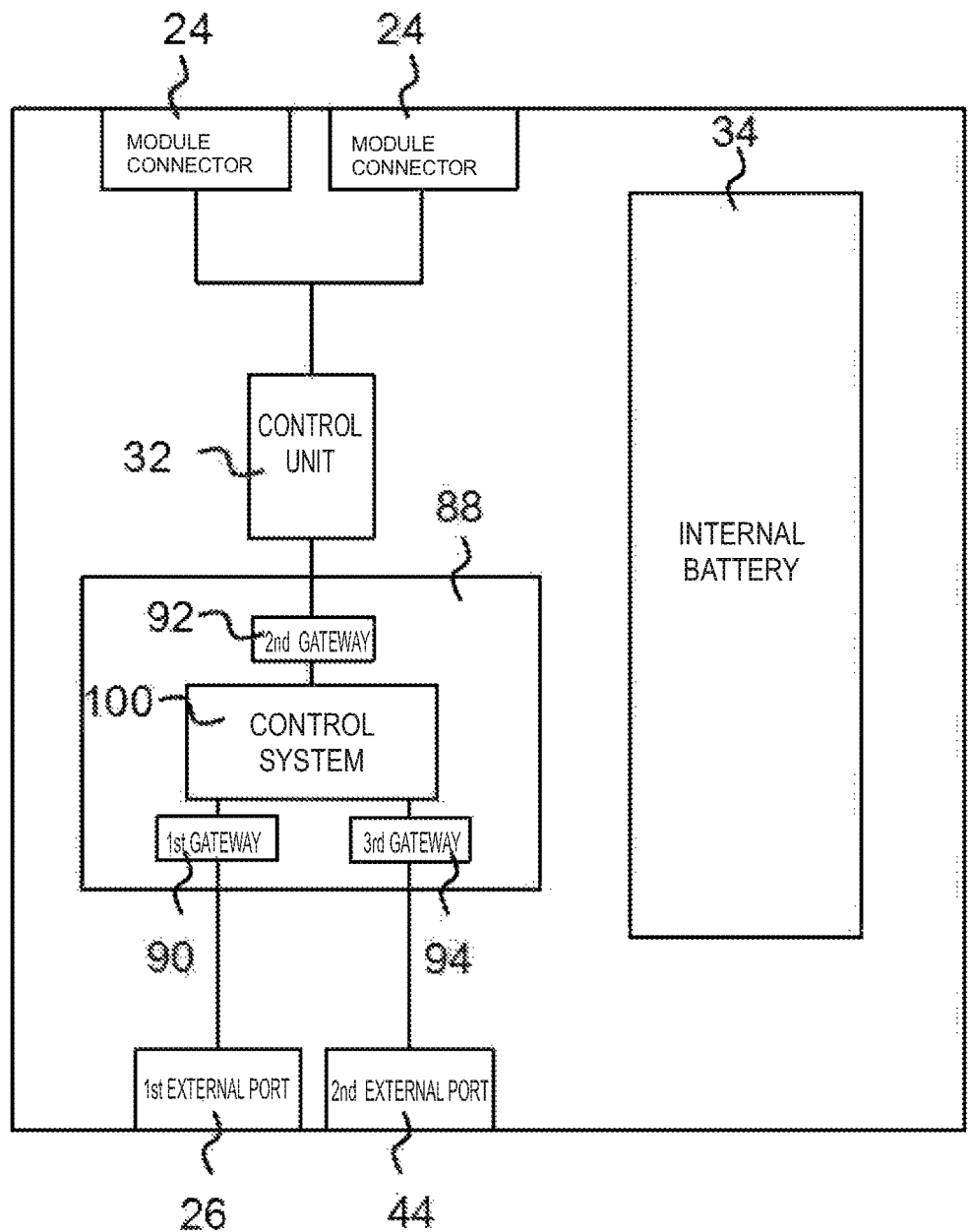
FIG. 8 is a system block diagram of the module receiving cradle according to a fourth embodiment of the present invention.

Now refer to the module docking hub 10 according to a fourth embodiment of the present invention as shown in FIG. 8. The module docking hub 10 of the fourth embodiment is the same as the module docking hub 10 of the first embodiment disclosed above except a second version super hub system 88 is included into the module receiving cradle 12. The module receiving cradle 12 of this embodiment further includes a second external port 44 as show in FIG. 7 and FIG. 8. The external ports can be a universal serial bus (USB) port, a Lighting port from Apple Inc., an Ethernet port, a controller area network (CAN) port, a pin connector or any other known computer bus. FIG. 8 shows a block diagram of the second version super hub system 88 including a first gateway 90 connected to the first external port 26, a third gateway 94 connected to the second external port 44, and a second gateway 92 connected to an internal port (not shown), which is further connected to the control unit 32 of the module receiving cradle 12. The second gateway 92 is configured to transfer at least power and/or data to the module receiving cradle 12, which will manage the at least power and/or data transfer between the module receiving cradle 12 and any module connected thereon. The first gateway 90 and the third gateway 94 are configured to transfer at least power and/or data to the external electronic products connected to the external ports. The second version super hub system 88 further includes a control system 100 connected to all the gateways. For example, the control system 100 can be a field-programmable gate array (FPGA). In one embodiment, the control system 100 further includes a non-transitory computer readable medium to store computer readable codes such that when it is executed by the microprocessor, it gives signals and controls to all the components of the second version super hub system 88 to perform and operate certain steps. The non-transitory computer readable medium may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

Now turns to the operation of the module docking hub 10 of same embodiment of the present invention. The module docking hub 10 of the fourth embodiment operates as same as the module docking hub 10 of the first embodiment disclosed above except the second version super hub system 88 of the module receiving cradle 12 acts as a power routing and optionally data communication hub between the first external port 26, second external port 44 and the internal port. The power (from the battery 34 and optionally from the battery within a module (if any of such module is attached to the module receiving cradle 12 and connected to the module connector 24)) can be routed from the internal port to the first external port 26 and second external port 44 through the second version super hub system 88. The power routed to the first external port 26 and/or the second external port 44 can be used to provide power to the external electronic product and/or charge any compatible rechargeable battery to any external product connected to the external port(s). The second version super hub system 88 of the present invention can intelligently and selectively to set each of its gateways as master or slave individually after detecting a slave or master status of the ports. The gateways communicate with the electronic device connected to the corresponding port, buffer the information inside the gateway and either process the data or transfer the data to another port through the corresponding gateway of that port. In one example, when a first electronic product is connected to the first external port 26, the second version super hub system 88 attempts to detect whether the first electronic product acts as a master. If it acts as a master, then the second version super hub system 88 configures the first gateway 90 to be a slave, so that the module docking hub 10 can at least route power and optionally perform data communication with the first electronic product. If the first external device acts as a slave, then the corresponding gateway 90 is set as master to ensure that at least power routing and optionally data communication can be properly established. Likewise, the other gateways are configured in a similar fashion. As such, the second version super hub system can have multiple power-masters and data-masters. The configuration of the ports is independent from each other. The control system 100 over sees both the power routing and optionally data communication with each connected electronic product. For data communication, it needs to understand what data format it is and to which other party it is to send to. It will perform data protocol conversion if necessary. For example, if the first external port 26 is a USB port and the second external port 44 is an Ethernet port, then the control system 100 will perform USB protocol to Ethernet protocol conversion internally when data is sent/received from both ports. The control system 100 needs to receive and unpack every data packet that it receives from the sending party and then pack it again in a protocol format that is used by the receiving party. At least the header of each package needs to be understood. The second version super hub system 88 facilitates at least power routing and optionally data communication among the electronic products by eliminating the hassle of the need for deciding which electronic product should be acted as master, which would require it to be plugged into a specific master port and which electronic product(s) should be acted as slave(s), which would require it/them to be plugged into a slave port(s). Thus an advantage of second version super hub system 88 is to alleviate users' concern whether the electronic product that he wants to connect to the system acts as a master or slave. The user can just plug the electronic product to any port available in the system, and the control system 100 will detect the master/slave status of the electronic device and configure the corresponding gateways according. Simultaneously, the control system 100 also performs any necessary data protocol conversion if necessary to ensure proper data exchange to and from the external electronic products.

Fifth Embodiment

Now refer to the module docking hub 10 according to a fifth embodiment of the present invention. The module docking hub 10 of the fifth embodiment is the same as the module docking hub 10 of the first embodiment disclosed above except it further includes a wireless communication module 40 as described in the second embodiment and either a first version super hub system 42 as described in the third embodiment or a second version super hub system 46 as described in the fourth embodiment. The operation of the module docking hub 10 of the fifth embodiment is the same as the module docking hub 10 of the first embodiment except it adds the functions of the second embodiment and either the third embodiment or the fourth embodiment as described above.

The following paragraphs describe the embodiments of the first version super hub system 42 and the second version super hub system 88.

First Version Super Hub System 42

The super hub system 20s in this section means the first version super hub system 42.

It is an object of the first version super hub system 42 to facilitate at least power routing and optionally data communications among electronic products, in particular, by intelligently assigning a port connected to a particular electronic product as master or slave.

Accordingly, the super hub system 20s, in one aspect, is a hub system (e.g. multiport device) configured to provide at least power routing and optionally data communications between different electronic products, including at least two ports configured to connect between the different electronic products; a hub including an upstream handler and at least one downstream handler, wherein the upstream handler is configured to connect at least one downstream handler inside the hub; a switch system capable of establishing connecting routes between each port to the upstream handler or to each of at least one downstream handler of the hub; and a controller configured to control the switch, wherein each connecting route transfers at least (electric) power and optionally data between the ports and the hub; wherein the controller is configured to control the switch to configure one of the ports as master by routing it to the upstream handler, and configure each remaining port as slave by routing each remaining port to one of the at least one downstream handler.

In one embodiment, the switch includes a matrix switch having a first predetermined number of inputs and a second predetermined number of outputs.

In yet another embodiment, at least one detector connected to at least one of the ports through a multiplexer connected to that port, wherein the detector configured to detect the electronic products connected to that port.

The first version super hub system 42 in yet another aspect is a method of operating a multiport device configured to provide at least power routing and optionally data communications between different electronic products including a step of determining a master-slave configuration of the multiport device including the steps of: a) receiving input signals from at least two ports of the multiport device, wherein the ports are connected to the different electronic products; b) analyzing each of the input signals based on a plurality of predetermined criteria; c) selecting one of the at least two ports to connect to an upstream handler of the multiport device based on at least one of the criteria and labeling the selected port as master; d) connecting each remaining port to one of the at least one downstream handler of the multiport device and labeling each remaining port as slave, wherein the upstream handler is configured to transfer at least (electric) power and optionally data to the at least one downstream handler; and the master controls the flow of at least (electric) power and optionally data between the master and each slave.

In one embodiment, the method further includes the steps of re-connecting the selected master port to one of the at least one downstream handler of the device and labeling it as slave; and re-connecting the one of each remaining port labeled as slave to the upstream handler of the device and labeling it as master, while the different electronic products are still connected to the ports.

There are many advantages to the first version super hub system 42. First of all, the first version super hub system 42 facilitates power routing and optionally data communications between the electronic products by eliminating the hassle of the need for deciding which electronic product should be acted or acting or assigned as master, which would require it to be plugged into a specific master port and which electronic product(s) should be acted or acting or assigned as slave(s), which would require it/them to be plugged into a slave port(s).

The advantage of the first version super hub system 42 as stated above can be realized by allowing the electronic products to be plugged into any ports of the first version super hub system 42 without worrying which electronic product should be acted or acting or assigned as master and which electronic product(s) should be acted or acting or assigned as slave(s). The first version super hub system 42 will intelligently assign a port connected to a particular electronic product as master or slave. Another advantage of the first version super hub system 42 is that the electronic products connected to the first version super hub system 42 can be switched between master and slave at the same port without the hassle of re-cabling as in conventional hub (e.g. un-plugging the electronic product from a slave port and re-plugging the electronic product to a master port). As such productivity can be enhanced. This advantage can be realized by "hot swap". "Hot swap" lets the first version super hub system 42 intelligently, automatically and internally swapping the ports between master and slave for at least one time while the electronic products connected to them are staying in the same ports during power routing and optionally data communications. "Hot swap" further allows the first version super hub system 42 intelligently, automatically and internally swapping the ports between master and slave when a particular electronic product connected to one of the ports of the system is replaced by another particular electronic product during power routing and optionally data communications.

Figure 9:
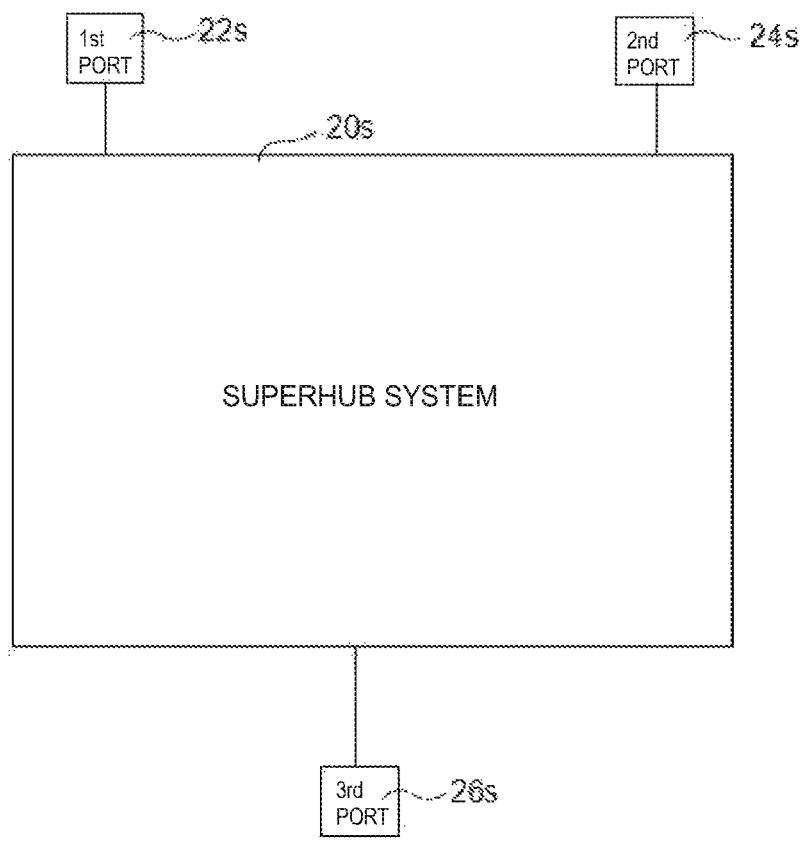
FIG. 9 is a block diagram illustrating an overview of a first version super hub system of the present invention.

FIG. 9 shows an overview of a super hub system 20s having a first port 22s, a second port 24s and a third port 26s, which are all configured to connect to electronic products. Each port can be either a universal serial bus (USB) port or a Lighting port from Apple Inc. or any other known computer bus. The super hub system 20s transfers at least electric power and optionally data between the ports. The super hub system 20s is configured to decide and set one of the ports as master and setting the remaining ports as slaves. In one example, the super hub system 20s perform "hot swap". "Hot swap" lets the super hub system 20s intelligently, automatically and internally swapping the ports between master and slave for at least one time while the electronic products connected to them are staying in the same ports during power routing and optionally data communications. 'Hot swap" further allows the super hub system 20s intelligently, automatically and internally swapping the ports between master and slave when a particular electronic product connected to one of the ports of the super hub system 20s is replaced by another particular electronic product during power routing and optionally data communications. The super hub system 20s may include an internal battery.

Figure 10:
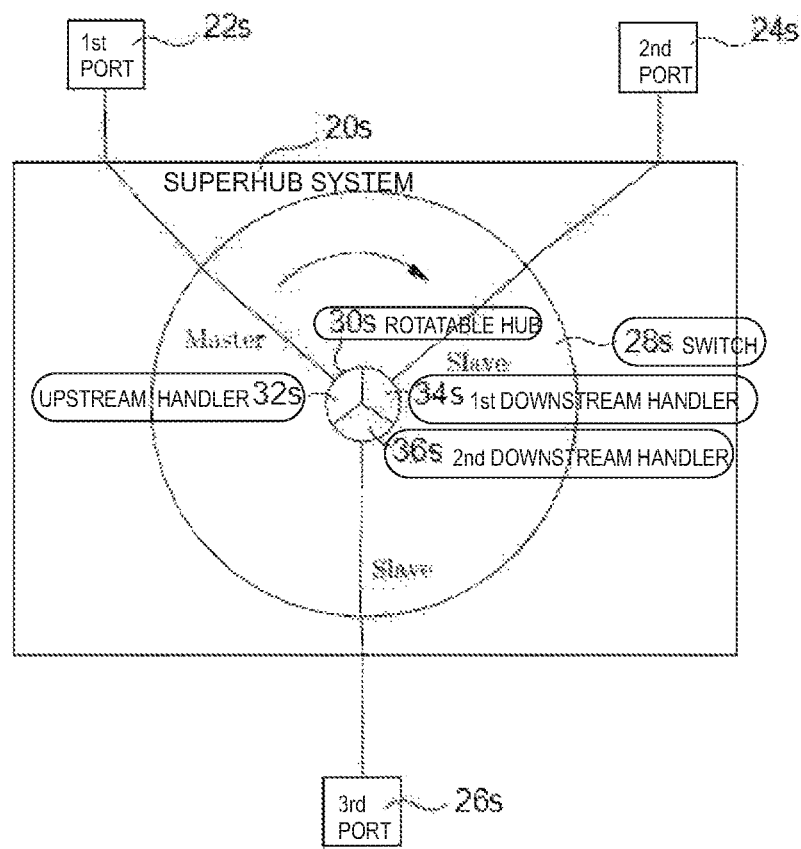
FIG. 10 is an exemplary block diagram illustrating one embodiment of the first version super hub system of the present invention.

In the first embodiment of the super hub system 20s as shown in FIG. 10, the super hub system 20s includes a switch 28s and a rotatable hub 30s having an upstream handler 32s, a first downstream handler 34s and a second downstream handler 36s. The upstream handler 32s is configured to transfer electric power and optionally data to the first downstream handler 34s and the second downstream handler 36s. Data can be transferred bi-directionally. The switch 28s, which is controlled by a controller (not shown), is configured to selectively establish a connecting route (for at least electric power and optionally data) between any port and either the upstream handler 32s, the first downstream handler 34s and the second downstream handler 36s. The port connecting the upstream handler 32s is labeled as master and the ports connecting the first downstream handler 34s and second downstream handler 36s are labeled as slaves. In this particular embodiment, both the switch 28s and the rotatable hub 30s are rotatable and the rotatable hub 30s rotates at the same rate as the switch 28s. The switch 28s further has three connecting points to make connections with all the ports at the same time. The rotatable hub 30s further includes a detecting unit (not shown) (e.g. detector) to at least detect the electronic products connected to the third port 26s. The detector is further connected to the controller.

Figure 11:
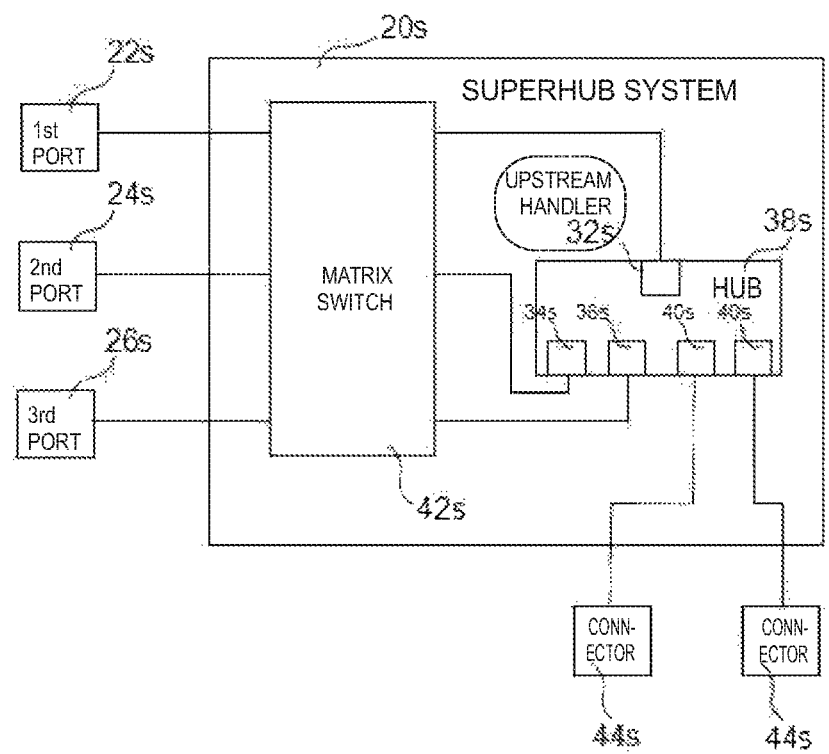
FIG. 11 is an exemplary block diagram illustrating second embodiment of the first version super hub system of the present invention.

In the second embodiment of the super hub system 20s as shown in FIG. 11, the super hub system 20s includes a matrix switch 42s and a hub 38s. The hub 38s includes the upstream handler 32s, first downstream handler 34s, second downstream handler 36s and two standalone downstream handlers 40s. The upstream handler 32s is configured to transfer electric power and optionally data to the first downstream handler 34s, the second downstream handler 36s and the two standalone downstream handlers 40s. Data can be transferred bi-directionally. The super hub system 20s further includes two connectors 44s, which are connected to the two standalone downstream handlers 40s. The two standalone downstream handlers 40s transfer power and optionally data to the two connectors 44s. Each connector 44s can be either a universal serial bus (USB) connector or a Lighting connector from Apple Inc. or any other known computer bus. The matrix switch 42s includes three input terminals and three output terminals. The input terminals are connected to the first port 22s, the second port 24s and the third port while the output terminals are connected to the upstream handler 32s, the first downstream handler 34s and the second downstream handler 36s. The matrix switch 42s, which is controlled by a controller (not shown), is configured to selectively establish a connecting route (for at least electric power and optionally data) between any port and either the upstream handler 32s, the first downstream handler 34s and the second downstream handler 36s. The port connecting the upstream handler 32s is labeled as master and the ports connecting the first downstream handler 34s and second downstream handler 36s are labeled as slaves. The matrix switch 42s further includes a detecting unit (not shown) (e.g. detector) to at least detect the electronic products connected to the third port 26s. The detector is further connected to the controller. Since the connectors 44s are directly connected to the two standalone downstream handlers 40s, the connectors 44s are always labeled as slaves.

Figure 12:
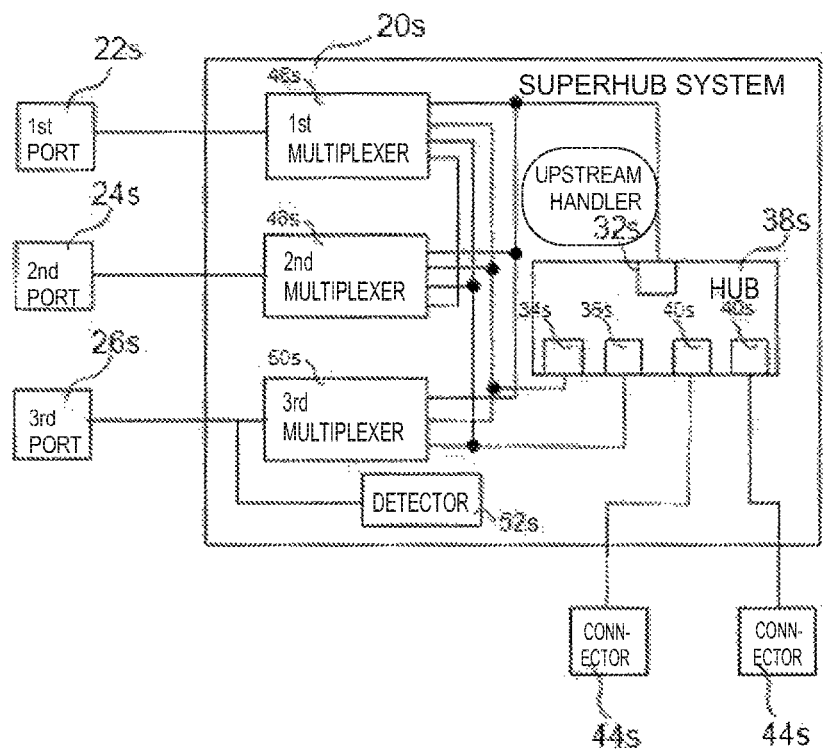
FIG. 12 is an exemplary block diagram illustrating third embodiment of the first version super hub system of the present invention.

In the third embodiment of the super hub system as shown in FIG. 12, the super hub system 20s includes a first multiplexer 46s, a second multiplexer 48s, a third multiplexer 50s, a detector 52s, the hub 38s and the two connectors 44s. In this embodiment, the hub 38s and the connectors 44s are identical to the hub 38s and the connectors 44s as mentioned in the second embodiment. The first port 22s, second port 24s and third port 26s are connected to the first multiplexer 46s, the second multiplexer 48s and the third multiplexer 50s respectively. Each multiplexer has four first terminals and one second terminal. The second terminal of each multiplexer is connected to its respective port. Three of the four first terminals of each multiplexer are connected to the upstream handler 32s, the first downstream handler 34s and the second downstream handler 36s respectively. The first multiplexer 46s and the second multiplexer 48s are further connected to each other via their respective fourth first terminals as shown in FIG. 12 such that electric power and optionally data can be directly transferred between the first port 22s and the second port 24s. Electric power from the connected electronic products can be saved by this configuration as no power is drawn by the hub 38s during the direct transfer of electric power and optionally data between the first port 22s and the second port 24s. For clarity, the fourth first terminal of the third multiplexer 50s is not shown in FIG. 12. The detector 52s is connected to the third port 26s to determine what kind of electronic product is connected to the third port 26s. Each multiplexer, which is controlled by a controller (not shown), is configured to selectively establish connecting routes (for at least electric power and optionally data) between its connected ports and either the upstream handler 32s or the first downstream handler 34s and the second downstream handler 36s as shown in FIG. 12. The port connecting the upstream handler 32s is labeled as master and the ports connecting the first downstream handler 34s and second downstream handler 36s are labeled as slaves. In one specific embodiment, the detector 52s is integrated into the controller. In another embodiment, the detector 52s is further connected to the first port 22s and/or second port 24s. In another embodiment, the detector 52s is further connected to a detector multiplexer (not shown) which is further connected to all the ports. As such, the single detector 52s can selectively be connected to each of the ports. In yet another specific embodiment, each port is further connected to its respective detector for detecting what kind of electronic product is connected to its respective port. In one specific embodiment, the first port 22s is connected to a phone plug in detector to determine whether a phone is connected to the first port 22s.

Figure 13:
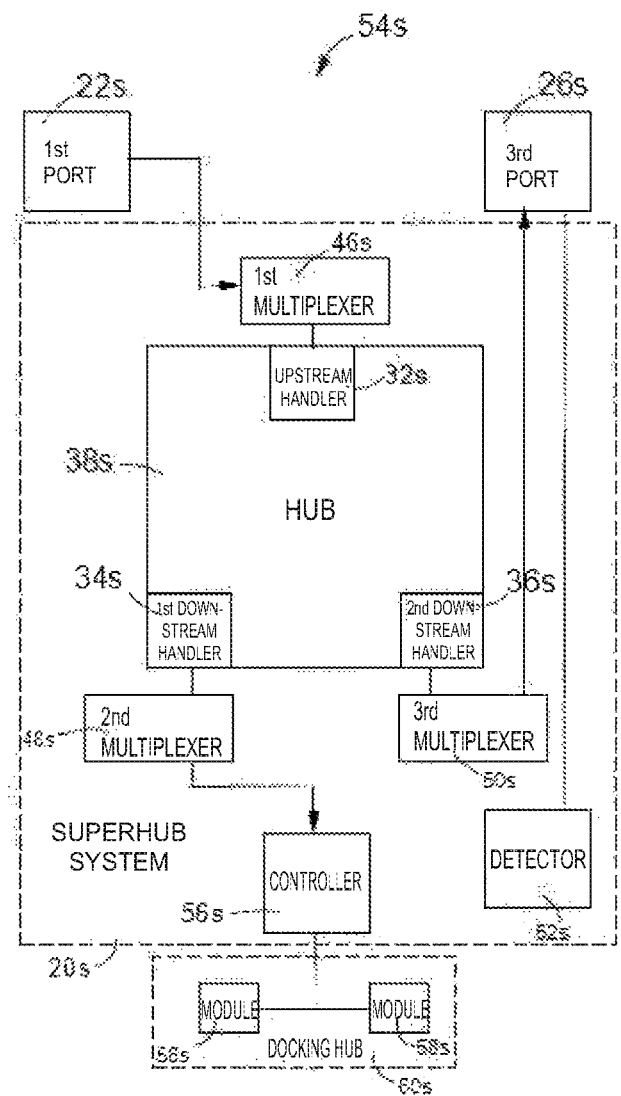
FIG. 13 is an exemplary block diagram illustrating fourth embodiment of the first version super hub system of the present invention.

In the fourth embodiment of the super hub system 20s of the present invention as shown in FIG. 13, the super hub system 20s is realized within a first peripheral device/apparatus 54s which can be attached to a portable device. In one embodiment, the first peripheral device/apparatus is a portable charger or a protective case. The portable charger or a protective case for a portable device includes a modules docking hub 60s and the super hub system 20s which further includes a first multiplexer 46s, a second multiplexer 48s, a third multiplexer 50s, a detector 52s, the hub 38s, and a controller 56s. If the first peripheral device/apparatus 54s is a portable charger, an extra rechargeable battery (not shown) will be included in the first peripheral device/apparatus 54s or the super hub system 20s. The modules docking hub 60s is configured to receive a plurality of modules 58s. The modules 58s have their unique functions and can include, but not limited to, either sensor(s), actuator(s), battery pack(s) or the combination thereof. The connections between the modules 58s and the modules docking hub 60s can be USB, Lighting port from Apple Inc. or any known computer bus. The hub 38s, the first multiplexer 46s, the second multiplexer 48s, the third multiplexer 50s, and the detector 52s, which are connected to the controller 56s, within the super hub system 20s are identical to those as mentioned in the third embodiment. The first multiplexer 46s and the second multiplexer 48s are further connected to each other (not shown in FIG. 13). A first port 22s, a second port (not shown) and a third port 26s are connected to the first multiplexer 46s, the second multiplexer 48s and the third multiplexer 50s respectively. The second port is directly connected to the modules docking hub 60s and is further connected to the second multiplexer 48s through the controller 56s. The second multiplexer 48s is connected to the modules docking hub 60s through the controller 56s. The controller 56s of this embodiment acts as gateway between the second multiplexer 48s and the modules docking hub 60s, as such the controller 56s can set the status of the modules docking hub 60s as a host (master) or a client (slave) while it can always act as master for the modules. The controller 56s further is configured to control the first multiplexer 46s, the second multiplexer 48s, the third multiplexer 50s to selectively establish a connecting route between one of ports 22s, 26s or the second port/modules docking hub 60s to either the upstream handler 32s, the first downstream handler 34s and the second downstream handler 36s. The port or second port/modules docking hub 60s connecting the upstream handler 32s is labeled as master and the ports or second port/modules docking hub 60s connecting the first downstream handler 34s and second downstream handler 36s are labeled as slaves. The detector 52s is connected to the third port 26s. The detector 52s is configured to detect what kind of electronic product is connected to the third port 26s. In one specific embodiment, the detector 52s is integrated into the controller. In another embodiment, the detector 52s is further connected to the first port 22s and/or second port/modules docking hub 60s. In another embodiment, the detector 52s is further connected to a detector multiplexer (not shown) which is further connected to all the ports. As such, the single detector 52s can selectively be connected to each of the ports. In yet another specific embodiment, each port is further connected to its respective detector for determine what kind of electronic product is connected to its respective port. Please be noted that FIG. 13 only shows one such connection configuration for clarity purpose. That is: first multiplexer 46s is connected to upstream handler 32s but in actual implementation, there are also electrical connections between the first multiplexer 46s and the first downstream handler 34s and the second downstream handler 36s. Similarly, the second multiplexer 48s and the third multiplexer 50s are also connected to the upstream handler 32s, the first downstream handler 34s and the second downstream handler 36s.

Figure 14:
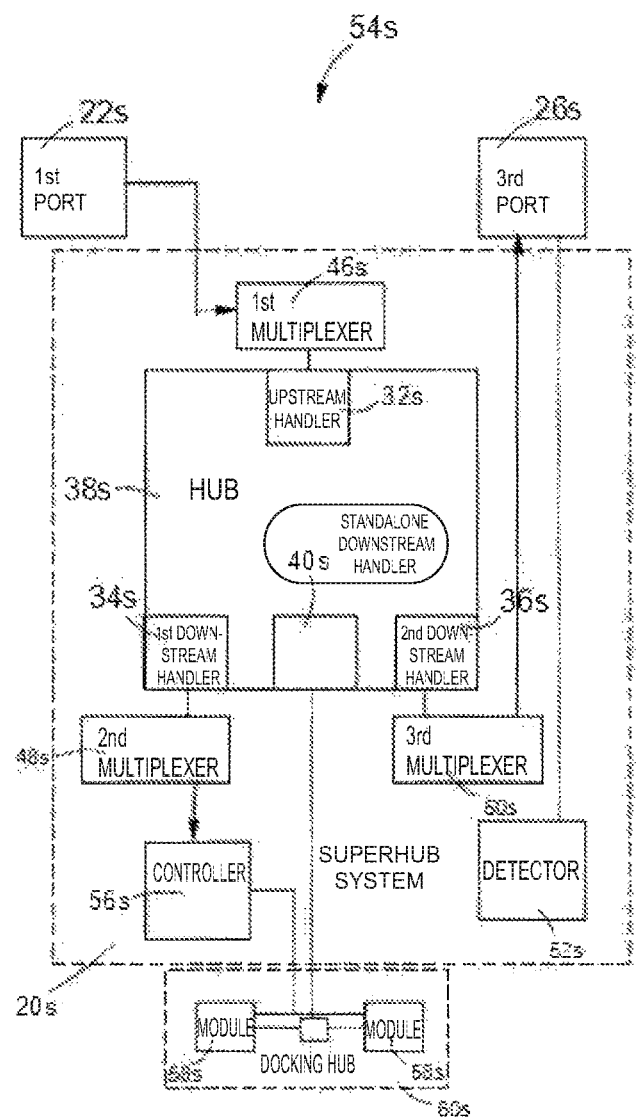
FIG. 14 is an exemplary block diagram illustrating fifth embodiment of the first version super hub system of the present invention.

In the fifth embodiment of the super hub system 20s of the present invention as shown in FIG. 14 is a variation of the first peripheral device/apparatus 62s. The variation of the first peripheral device/apparatus 62s of this embodiment is similar to the first peripheral device/apparatus 54s as shown in the fourth embodiment. However, it further includes a standalone downstream handler 40s which is directly connected to the modules docking hub 60s at a modules connection hub within the modules docking hub 60s. The modules connection hub acts as a hub for the communication between the connected module(s) and the standalone downstream handler 40s. The connection between the modules docking hub 60s and the standalone downstream handler 40s can be USB, Lighting from Apple Inc. or any known computer bus. The controller 56s is further connected to the modules docking hub 60s through SPI (Serial Peripheral Interface) and/or MIPI (Mobile Industry Processor Interface), or any other known computer bus.

The system (e.g. the embodiments as suggested above) generally comprises memory, which may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms. The memory contains a computer readable program when executed by the controller 56s, which can be a central processing unit (CPU), causes the controller 56s executes at least part of the steps as stated below. The controller 56s gives and receives signals to and from the detectors and the multiplexers for executing the actions as stated above and the operations as stated below.

The super hub system 20s can operate according to one embodiment of the present invention with any port being connected to either nothing or an electronic product selected from a group consisting of a portable device (with or without internal battery), a master electronic device (e.g. an electronic device that always acts as a master, for example, desktop or laptop computer), a power supply (e.g. charger or battery charger), an accessory (e.g. USB flash drive, keyboard, and mouse) or the modules docking hub 60s (with or without battery module therein). The super hub system 20s of the present invention based on what its ports are connected to, selectively establishes connecting routes between its connected ports and either the upstream handler 32s or the first downstream handler 34s and the second downstream handler 36s. The port connecting the upstream handler 32s is labeled as master and the ports connecting the first downstream handler 34s and second downstream handler 36s are labeled as slaves. The connecting routes are used to transfer electric power and optionally data.

For data communication/transfer, the priority of selecting which port is master (data-master) is ranked as follows. The highest priority is given to the port that is connected to a master electronic device (e.g. an electronic device that always acts as master, for example, desktop or laptop computer). Then the second priority is given to the port that is connected to a portable device that is in docking mode if the portable device supports docking mode. Further, the third priority is given to the port that is connected to a portable device that is acting as a host (master). The condition for the third priority is that there has to be no connection between the power supply and the super hub system 20s. Further, the modules docking hub 60s connected does not have battery module therein as well. The lowest priority is given to the port that is connected to the modules docking hub 60s. The condition is that either no portable device is connected to the super hub system 20s or the portable device does not support docking mode and the battery level of the portable device is low (e.g. <5%). The priority of selecting which port as master is summarized in table 1.

TABLE 1

| Master Priority | Port connected to | Condition |
| --- | --- | --- |
| 1 | master electronic device (e.g. an electronic device that always acts as | if the master electronic device (e.g. an electronic device that always acts as master, |

TABLE 1-continued

| Master Priority | Port connected to | Condition |
| --- | --- | --- |
|  | master, for example, personal computer) | for example, desktop or laptop computer) is connected |
| 2 | portable device (as docking master) | if the portable device supports docking mode |
| 3 | portable device (as normal master) | if no power supply is connected AND a modules docking hub 60s does not have battery module therein |
| 4 | modules docking hub 60s | if (1) the portable device does not support docking mode AND the battery level of the portable device is low (e.g. <5%); OR (2) no portable device is connected |

If two or more similar or identical electronic products are connected to the ports of the super hub system 20s (for example, a desktop computer and a laptop computer or two portable devices), then the user will determine which port will become the master.

For power routing, a table illustrating the power output priority (the priority of selecting which port as master for supplying power when two or more devices as listed under "power output priority" in FIG. 15 are connected to the ports) and power input priority (the priority of port(s) receiving power from the master port; note: the port(s) receiving power from the master is labeled as slave(s)) in accordance with the same embodiment of the super hub system 20s is shown in FIG. 15. As previously defined at the beginning of this section, "master" and "slave" in the following paragraphs that describe FIG. 15 refer to "power-master" and "power-slave". The priority of selecting which port as master for supplying power is ranked (from highest to the lowest) as follow: from the port that is connected to (1) the power supply, (2) the master electronic device (e.g. an electronic device that always acts as master, for example, desktop or laptop computer), (3) the modules docking hub 60s with battery module therein, (4) the internal battery of the super hub system 20s, and (5) the internal battery of the portable device. The internal battery of the super hub system 20s is used if either (a) the portable device is not supporting docking mode and its internal battery needs to get charged and the controller 56s of the super hub system 20s is connected or (b) no portable device is connected to the system 20s and the controller 56s is not sleeping and there is two active ports.

For the first priority as mentioned above (Case I): when the port, that is connected to the power supply, is selected as a master for supplying power, the power is supplied to the following device according to the following priority (from highest to lowest) (1) the portable device to charge its internal battery until its battery level reaches 10%, (2) the super hub system 20s to charge its internal battery until 100 mAh, (3) any electronic product that is connected to the super hub system 20s, (4) the portable device to charge its internal battery until it is full, (5) the super hub system 20s to charge the internal battery until full and (6) any battery module connected to the modules docking hub 60s until it is full (if there is more than one battery modules connected, the charging priority should start from the battery module having highest battery percentage among the connected battery modules).

For the second priority as mentioned above (Case II): when the port, that is connected to the master electronic device (e.g. an electronic device that always acts as master, for example, desktop or laptop computer), is selected as a master for supplying power, the power is supplied to the following device according to the following priority (from highest to lowest) (1) the portable device to charge its internal battery until its battery level reaches 10%, (2) the super hub system 20s to charge the internal battery until 100 mAh, (3) any electronic product that is connected to the super hub system 20s, (4) the portable device to charge its internal battery until it is full, (5) the super hub system 20s to charge the internal battery until full and (6) any battery module connected to the modules docking hub 60s.

For the third priority as mentioned above (Case III): when the port, that is connected to the modules docking hub 60s with battery module therein, is selected as a master for supplying power, the power is supplied to the following device according to the following priority (from highest to lowest) (1) the portable device to charge its internal battery until its battery level reaches 10% (only if the maximum output current of the battery module in the modules docking hub 60s is high enough; otherwise power only a part of it or skip it or combine it with other power source), (2) the super hub system 20s to charge the internal battery until 100 mAh, (3) any electronic product that is connected to the super hub system 20s (only if the maximum output current of the battery module in the modules docking hub 60s is high enough; otherwise power only part of it or skip it or combine it with other power source; further, the user can choose whether the power should be supplied to any electronic product that is connected to the super hub system 20s), and (4) the portable device to charge its internal battery until it is full. In one embodiment, the battery module connected to the modules docking hub 60s may contain a plurality of battery modules. In this case, the power will be drawn from the battery module with the lowest battery level first until it reaches 5% before drawing power from the battery module with the higher battery level until it reaches 5%.

For the fourth priority as mentioned above (Case IV): when the port, that is connected to the internal battery of the super hub system 20s, is selected as a master for supplying power, the power is supplied to the following device according to the following priority (from highest to lowest) (1) the portable device to charge its internal battery until its battery level reaches 10%, (2) any electronic product that is connected to the super hub system 20s (until the internal battery of the super hub system 20s is equal or less than 100 mAh), and (3) the portable device to charge its internal battery until it is full (until the internal battery of the super hub system 20s is equal or less than 100 mAh). The power is supplied as discussed in case IV only if the maximum output current of the internal battery of the super hub system 20s is high enough; otherwise power only part of it or skip it or combine it with other power source.

For the fifth priority as mentioned above (Case V): when the port, that is connected to the internal battery of the portable device, is selected as a master for supplying power, the power is supplied to the following device according to the following priority (from highest to lowest) (1) the super hub system 20s to charge the internal battery until 100 mAh, and (2) any electronic product that is connected to the super hub system 20s. Case V continues to run until the battery level of the internal battery of the portable device falls below a certain threshold (e.g. equal or less than 20%).

The following is an example showing the operation of the super hub system 20s in terms of power routing under different scenarios. In this example, the super hub system 20s starts its operation by drawing the power from the internal battery of the super hub system 20s, the power will be supplied as shown in case IV. If the internal battery of the super hub system 20s is used up or the battery level of the internal battery of the super hub system 20s drops below a level (e.g. below 5%), the super hub system 20s will draw the power from the internal battery of the portable device. The power will be supplied as shown in case V. If the super hub system 20s then is connected to a power supply, the super hub system will draw the power from the power supply and the power will be supplied as shown in case I.

The super hub system 20s can also operate according to another particular exemplary embodiment. In this embodiment, the first port 22s and the second port 24s are connected to a portable device and a modules docking hub 60s. The portable device, which can be a smartphone, can be set in either one of the three modes, namely master, slave and docking mode. The portable device usually includes at least one rechargeable battery within the device. The third port 26s is left open for a connection to an external device. An external device is selected from a group consisting of master electronic devices, power supplies and electronic accessories.

In this particular exemplary embodiment, the power logic is as follows. The super hub system 20s first draws the power from any potential available power source by pure hardware (without any software or controller running) to wake itself up. The potential available power source can be from the internal battery of the modules docking hub 60s, the battery module connected to the modules docking hub 60s, an internal battery of the portable device, the master electronic device and/or the power supply. After the super hub system 20s wakes up, it first detects if there is any power supply connected to the third port 26s. If a power supply is connected to the third port 26s, the super hub system 20s then detects (1) if the battery level in the portable device is less than 100% and (2) if there is battery module in the modules docking hub 60s or any internal battery within the super hub system 20s. For (1), if the battery level in the portable device is less than 100%, the power supply will supply power to the portable device to charge the battery therein. If otherwise, the battery of the portable device will not be charged and the portable device will not supply any power to the super hub system 20s. For (2), if there is at least one battery module in the modules docking hub 60s, the super hub system 20s will determine if battery level in the battery module has less than 100%. If it is less than 100%, the power supply will supply power to the modules docking hub 60s to charge the battery module. Otherwise, the battery module of the modules docking hub 60s is not charged and the modules docking hub 60s does not supply any power to the super hub system 20s. In this case, the charger will be the power supplying master.

If no power supply is connected to the third port 26s, the super hub system 20s will detect if there is battery module in the modules docking hub 60s or any internal battery within the super hub system 20s. If there is no battery module in the modules docking hub 60s, the phone will be the master for supplying the power.

If there is battery module in the modules docking hub 60s or any internal battery within the super hub system 20s, the super hub system 20s will detect if the battery module or the internal battery has a battery level that is higher than 5%. If yes, the modules docking hub 60s will be the master for supplying power and the battery within the portable device will be charged. If no, the phone will be the master for supplying the power.

There are two special cases for the operation of the super hub system 20s in this particular exemplary embodiment. The first one is when the super hub system 20s acts as a fake master. In this case, the super hub system 20s receives power from the power supply and use the power from the power supply to provide power to other ports while pretending itself as a master. The second one is when the portable device is in docking mode.

In the docking mode, the portable device is master (as such the port connected thereto will be assigned as master) while the portable device receives power.

Figure 16:
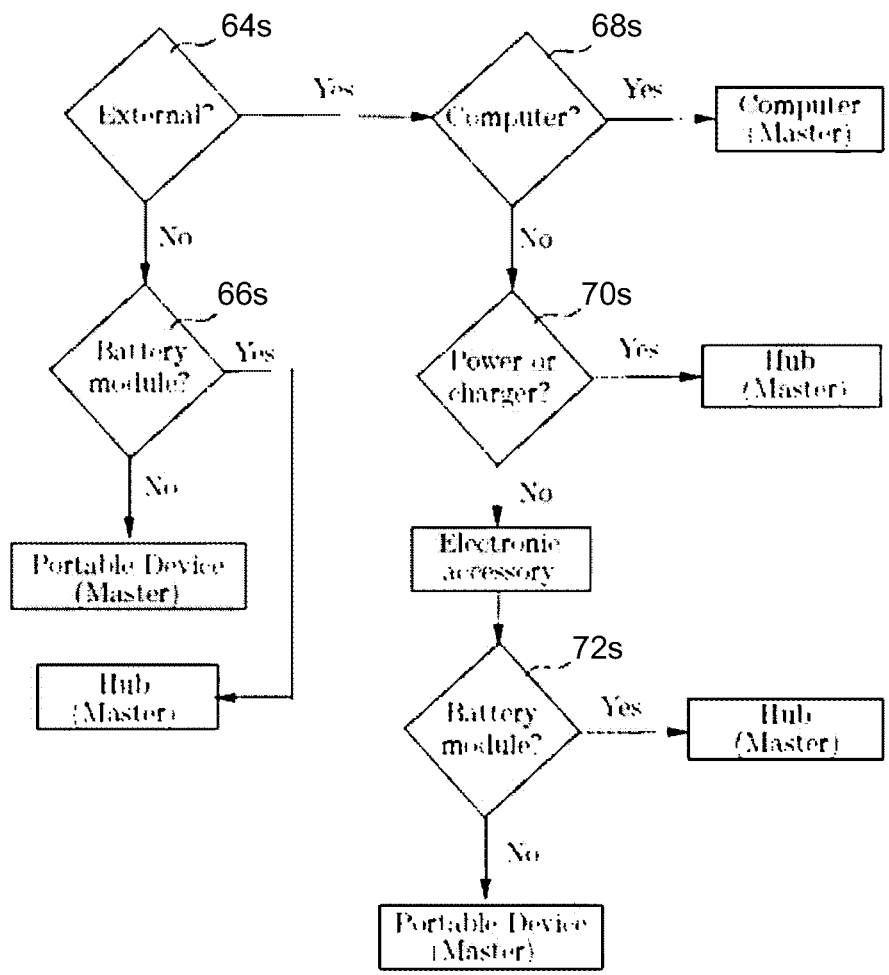
FIG. 16 is an exemplary flowchart illustrating an operation of the first version super hub system according to one exemplary embodiment of the present invention.

FIG. 16 shows a flowchart according to yet another embodiment of the operation of the super hub system 20s for determining which one of the ports is master and which ports are slaves for power routing. As previously defined at the beginning of this section, "master" and "slave" in the following paragraphs that describe FIG. 16 refer to "power-master" and "power-slave". In order to determine the aforesaid, the controller 56s of the super hub system 20s first check if the third port 26s is connected to any external device in step 64s. Please note that the information of whether the third port 26s is connected to any external device or what kind of external device is connected to the third port (if an external device is connected) is fed from the detector 52s to the controller 56s. After receiving the information, the controller then performs the followings based on the information given. After the checking step 64s, if the third port 26s is not connected to any external device, the super hub system 20s then detects if a battery module is docked at the modules docking hub 60s in step 66 (if it is connected to the port). If there is a battery module docked at the modules docking hub 60s and connected to the super hub system 20s, the super hub system 20s will then determine the port that connects to the modules docking hub 60s itself as master. In this case, the power will be supplied from the battery module to the portable device through the modules docking hub 60s if the electric level in the battery module is equal or more than 5% of its full capacity. The power supplied to the portable device will be used to charge the battery within therein. If the battery module has less than 5% of its capacity, the portable device will provide power to itself and the modules docking hub 60s. If there is no battery module docked at the modules docking hub 60s, the port connecting the portable device will become master. The portable device will supply power to itself and the modules docking hub 60s.

If there is an external device connected to the third port 26s and the external device connected is a computer, the super hub system 20s will set the third port 26s as master in step 68s. In this case, the power will be supplied from the computer to the portable device and the module docking hub 60s. If the external device connected to the third port 26s is a power supply, the super hub system 20s will set the port connecting to the modules docking hub 60s itself as master and remaining ports as slaves in step 70s. Since a power supply does not have any intelligence, the super hub system 20s only allows the pure power supply unit to provide power to the modules docking hub 60s and the portable device but not setting the port which connects to the power supply as master. The power supply in this case will charge the battery within the portable device and the battery module (if any) docked to the modules docking hub 60s if they are not full. If the external device is the electronic accessory, the third port 26s will not be set as master. The super hub system 20s determines whether the port connecting to the module docking hub 60s or the port connecting to the portable device is the master in step 72s. The step 72s determines if there is a battery module docked at the module docking hub 60s and connected to the super hub system 20s. If that is the case, the super hub system 20s will then determine the port that connects to the modules docking hub 60s as master. In this case, the power will be supplied from the battery module to the modules docking hub 60s to the portable device and the electronic accessory if the battery module has equal or more than 5% of battery. The power supplied to the portable device will be used to charge the battery within the device. If the battery module has less than 5% of battery, the portable device will provide power to itself, the electronic accessory and the modules docking hub 60s. If there is no battery module docked at the modules docking hub 60s, the port connecting the portable device will become master. The portable device will supply power to itself, the electronic accessory and the modules docking hub 60s. More than one battery module can be docked at the modules docking hub 60s.

Figure 17:
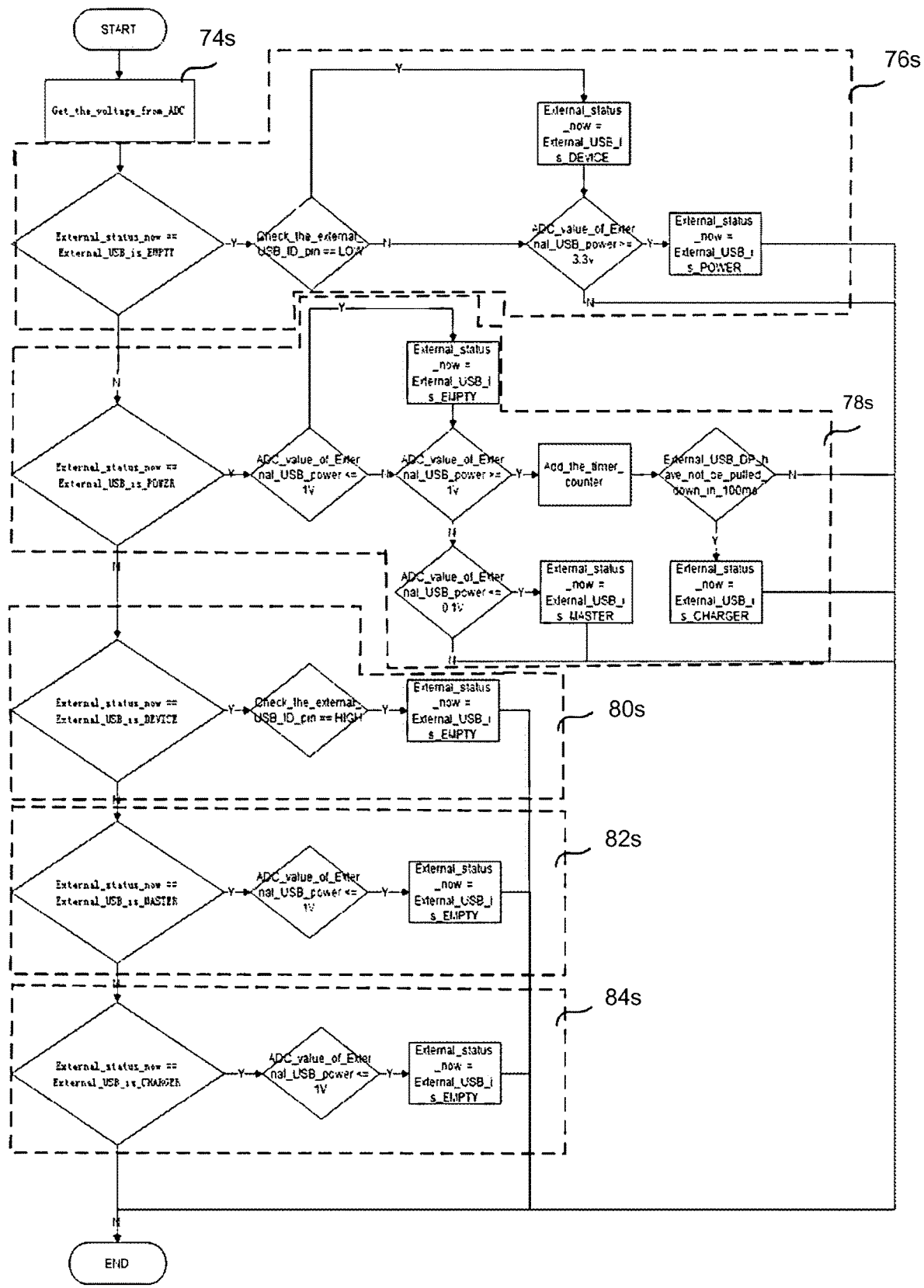
FIG. 17 is an exemplary flowchart illustrating an operation of the detector the first version super hub system according to one embodiment of the present invention.

FIG. 17 shows a flowchart illustrating an example of an operation of the detector 52s which is connected to a USB port. It indicates the steps on how the detector 52s determines whether the third port 26s is connected to any external device or what kind of external device is connected to the third port 26s (if an external device is connected). The detector 52s is configured to assign a label to the external device, which will be used to determine whether the third port 26s is connected to any external device or what kind of external device is connected to the third port 26s (if an external device is connected). There are, for example, five labels for the external device namely, (1) empty, (2) power, (3) device, (4) master and (5) charger. The empty label means that there is nothing connected to the port which the detector 52s detects ("Detected Port"). The power label means that a power source is connected to the Detected Port. The device label means that the electronic accessory is connected to the Detected Port. The master label means that a computer is connected to the Detected Port. Lastly, the charger label means that a charger is connected to the Detected Port.

First the detector 52s obtains a voltage (at least one voltage level) from an analog to digital ("ADC") from at least one USB pins (e.g. power pin, ID pin, etc) (e.g. the detector 52s obtains power reading from a power pin) in step 74s for assigning an initial label to the external device based on the obtained voltage.

If the initial label of empty is selected, step 76s will be performed to assign a final label to the external device and give a final determination of the external device. In step 76s, the detector 52s first checks if the USB ID pin of the external device is low. If it is low, a device label to the external device will be assigned. Then the USB power from the external device is checked to see if it is greater than or equal to 3.3V. If it is not the case, the device label will be set to the external device and the external device will be determined as the electronic accessory. If it is the case, a new power label will be assigned to the external device and the external device will be determined as the power source. If the USB ID pin of the external device is not equal to low, the detector 52s then checks the USB power from the external device from the ADC to see if it is greater than or equal to 3.3V. If that is the case, a power label will be assigned to the external device and the external device will be determined as the power source. Otherwise, the device label is set to the external device and the external device is determined as the electronic accessory.

If the initial label of power is selected, step 78s is performed. First, checks if the USB power from the external device from the ADC is less than or equal to 3.3V. If it is the case, empty label will be assigned. Then, a second test will be performed. In the second test, the USB power from the external device from the ADC is checked to see if it is greater than or equal to 1V in the second test. If it is not the case in the first step, the second test will be performed directly. If the USB power from the external device from the ADC is not greater than or equal to 1V (i.e. "no" for the second test), then the USB power from the external device from the ADC will be checked to see if it is less than or equal to 0.1V. If it is the case, a new master label will be assigned to the external device and the device will be determined as computer. If it is not the case, the respective assigned label will not be changed and the external device will be determined as either none or power source depending on the result in the first step. If in the second test, the USB power from the external device from the ADC is greater than or equal to 1V (i.e. "yes" in the second test), the USB DP of the external device will be checked to see if it has not be pulled down in 100 ms. If it is not the case, the respective assigned label will not be changed and the external device will be determined as either none or power source depending on the result in the first step. If it is the case, a new charger label will be assigned and the external device will be determined as a charger.

If the initial label of device is selected, step 80s will be performed. First, the detector 52s checks if the USB ID pin of the external device is high. If it is the case, a new empty label will be assigned and the external device will be determined as none. If it is not the case, the external device will be determined as the electronic accessory.

If the initial label of master is selected, step 82s will be performed. First, check if the USB power from the external device from the ADC is greater than or equal to 1V. If it is the case, a new empty label will be assigned and the external device will be determined as none. If it is not the case, the external device will be determined as the computer.

If the initial label of charger is selected, step 84s will be performed. First, check if the USB power from the external device from the ADC is greater than or equal to 1V. If it is the case, a new empty label will be assigned and the external device will be determined as none. If it is not the case, the external device will be determined as the charger.

Although the super hub system referred to particular embodiments, it will be clear to one skilled in the art that the super hub system 20s may be practiced with variation of these specific details. Hence this invention should not be construed as limited to the embodiments set forth above.

For example, for the number of ports, connectors, detectors and multiplexers, any number of ports, connectors, detectors and multiplexers can be used as long as it does not deviate from the intended purpose of the super hub system 20s.

It is noted that although the operation of the detector 52s of the above example used with a USB port, the detection of an electronic product by the detector 52s can also be made for the lighting port and any other known computer bus by certain changes that may be made in the above construction and/or method without departing from the scope (e.g. obtaining appropriate OTG signals or lighting port signals for labeling and determine the external device).

Also, although the specification above only indicates that the first port is connected to the portable device, the second port is connected to a standalone modules docking hub or replaced by the modules docking hub and the third port is configured to connect to the external device, the ports can be arbitrarily assigned to portable device, module hub and external device as long as it does not deviate from the intended purpose of the super hub system 20s.

The first version super hub system 42 is thus fully described.

Second Version SuperHub System 88

The second version super hub system is a hub system (e.g. multiport device) configured to provide at least power routing and optionally data communications between different electronic products, including at least two ports configured to connect between the different electronic products; at least two gateways connected to the ports, respectively; and a control system connected to the gateways, wherein each gateway individually detects a master/slave status of the electronic product connected to the port; wherein the control system is configured to control each gateway to perform self-configuration to match the master/slave status of each electronic product connected to the port; wherein the control system is configured to establish connecting routes between each port for transferring at least electric power and optionally data between each port.

The present invention in yet another aspect is a method of operating a multiport device configured to provide at least power routing and optionally data communications between different electronic products including the steps of: a) receiving input signals from at least two ports of the multiport device, wherein the ports are connected to the different electronic products; b) detecting a master/slave status of each electronic product by analyzing each of the input signals of the port connected to the electronic product based on a plurality of predetermined criteria; c) configuring the multiport device to match the master/slave status of each electronic product connected to the multiport device, wherein at least power and optionally data can be exchanged among the electronic products and the multiport device.

Figure 18:
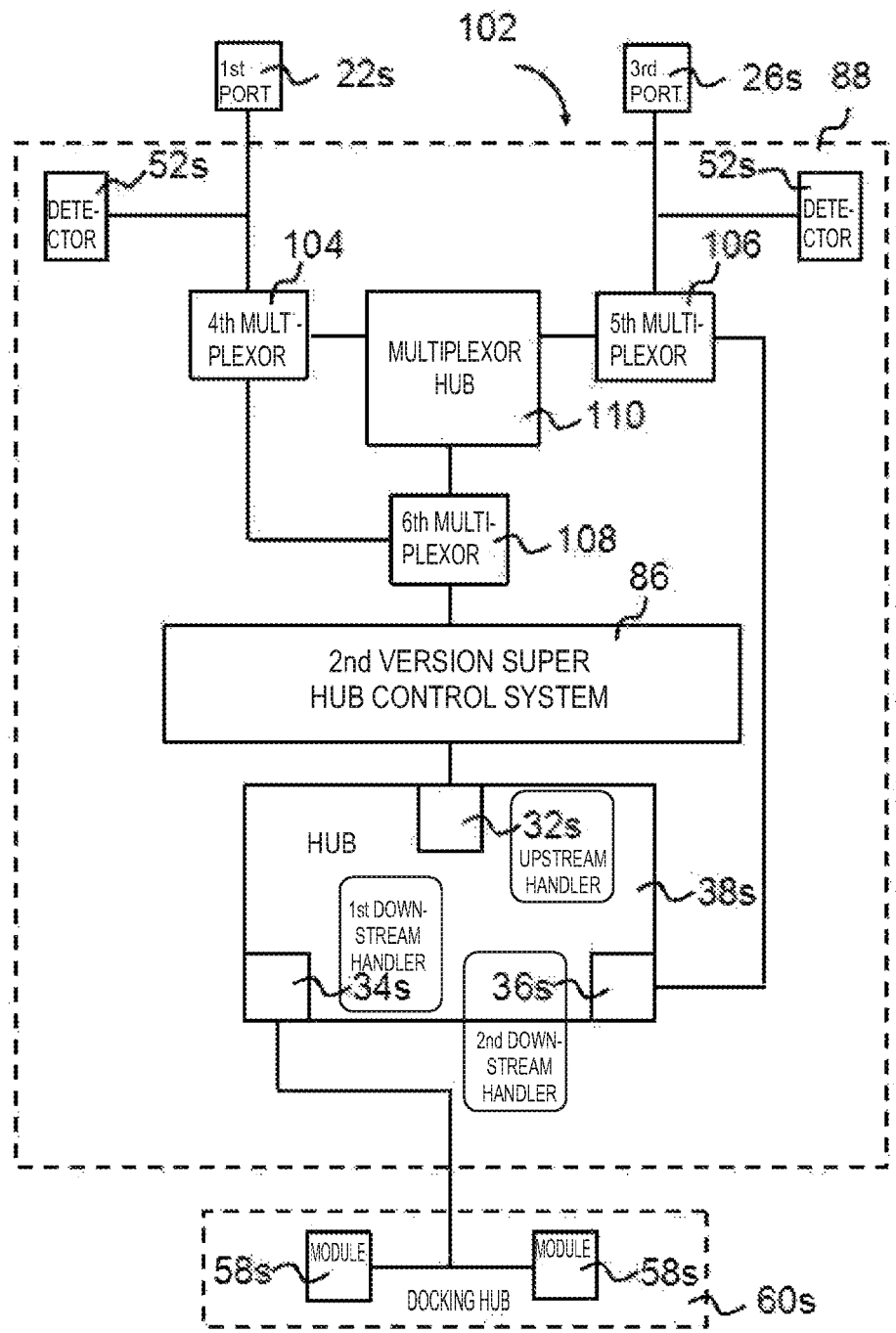
FIG. 18 is an exemplary block diagram illustrating one embodiment of the second version super hub system of the present invention.

A specific implementation of the second version super hub system of the present invention is shown in FIG. 18. The second version super hub system 88 is realized within a second peripheral device/apparatus 102 which can be attached to a portable device. In one embodiment, the second peripheral device/apparatus is a portable charger or a protective case. The portable charger or a protective case for a portable device includes a modules docking hub 60s and the second version super hub system 88 which further includes a fourth multiplexer 104, a fifth multiplexer 106, a sixth multiplexer 108, a multiplexer hub 110, two detectors 52s, a hub 38s, and a second version super hub system control unit 86. The first port 22s and the third port 26s are connected to the fourth multiplexer 104 and the fifth multiplexer 106, respectively. The second version super hub system control unit 86 can be a central process unit (CPU), an application-specific integrated circuit (ASIC), a field-programmable gate array (FPGA) or any other intelligent chips. The hub 38s includes an upstream handler 32s, a first downstream handler 34s, and a second downstream handler 36s. The upstream handler 32s is configured to transfer electric power and optionally data to the first downstream handler 34s and the second downstream handler 36s. Data can be transferred bi-directionally among the upstream handler and the downstream handlers. The multiplexer hub 110 is configured to connect to the fourth multiplexer 104, the fifth multiplexer 106 and the fifth multiplexer 108. A direct connecting route between the first port 22s and the third port 26s can be established through the multiplexer hub 110 without going through the control unit if necessary. The fifth multiplexer 106 is further connected to the downstream handler 36s. The sixth multiplexer 108 is further connected to the fourth multiplexer 104 and the second version super hub system control unit 86. The second version super hub system control unit 86 is connected to the upstream handler 32s. Each of the two detectors 52s is connected to the first port 22s and the third port 26s, respectively, to detect what kinds of electronic product are connected to the ports. In one specific embodiment, each of the detectors 52s is integrated into the fourth multiplexer 104 and the fifth multiplexer 106. In another embodiment, the detector 52s is further connected to a detector multiplexer (not shown) which is further connected to all the ports. As such, the single detector 52s can selectively be connected to each of the ports. The second port 24s becomes an internal port connecting the modules docking hub 60s to the downstream handler 34s and hence it is not shown in FIG. 18. The modules docking hub 60s is configured to receive a plurality of modules 58s. The modules 58s have their unique functions and can include, but not limited to sensor(s), actuator(s), battery pack(s) or the combination thereof. The connections between the modules 58s and the modules docking hub 60s can be USB, Lighting port from Apple Inc. or any known computer bus. If the second peripheral device/apparatus 102 is a portable charger, an extra rechargeable battery (not shown) will be included in the second peripheral device/apparatus 102 or the second version super hub system 88.

Now turn to the operation of the second peripheral device/apparatus 102 of the second embodiment of the second version super hub system of the present invention. The second version super hub system 88 acts as a power routing and optionally data communication hub between the first port 22s, second port 24s and the third port 26s. The power routed to the ports can be used to provide power to the external electronic product and/or charge any compatible rechargeable battery in any external product connected to the port(s). The second version super hub system 88 of the present invention can intelligently and selectively set the first port 22s and the third port 26s as power-master, power-slave, data-master or data-slave individually and independently of each port after detecting a corresponding slave or master status of the ports via detector 52s. The second port 24s, which is directly connected to the modules docking hub 60s and is further connected to the downstream handler 34s, is always labeled as data-slave because it is connected to the downstream handler. As such, the modules docking hub 60s and the modules 58s therein are always labeled as data-slave. Otherwise, this specific implementation realizes the features and operations of the second version super hub system 88 as mentioned in previous paragraphs. In particular, it will detect the master/slave status of the electronic product(s) connected to port 22s and/or port 26s and establish connecting route for proper data communication and power exchange.

The second version super hub system 88 can operate according to one embodiment of the present invention with any port being connected to either nothing or an electronic product selected from a group consisting of a master electronic device (for example, an electronic device that always acts as a master such as a desktop or laptop computer), a power supply (e.g. charger or battery charger), a portable device (e.g. a smartphone with Android or iOS operating system) or an electronic accessory (e.g. USB flash drive, keyboard, and mouse). The second version super hub system 88 of the present invention can, based on what its ports are connected to, selectively establish connecting routes between its connected ports. The connecting routes are used to transfer electric power and optionally data.

For power routing, the power output priority (the priority of selecting which port as master (power-master) for supplying power) is ranked from the highest to the lowest as follow: from the port that is connected to (1) the power supply, (2) the master electronic device, (3) the modules docking hub with a battery module therein, (4) the internal battery of the second version super hub system 88, and (5) the internal battery of the portable device.

For data communication/transfer, the priority of selecting which port as master (data-master) is ranked from the highest to the lowest as follow: from the port that is connected to (1) the master electronic device, (2) the second version super hub system control unit 86 of the second version super hub system 88, (3) the portable device connected to the second version super hub system 88. A portable device connected to the second version super hub system can act as both power-master and data-slave at the same time. A portable device connected to the port acts as both power-slave and data-slave if the internal battery of the second version super hub system 88 supplies power. If the internal battery of the second version super hub system 88 is used up or the battery level of the internal battery of the second version super hub system 88 drops below a level (i.e. below 5%), then the internal battery of the portable device supplies power, which means that the portable device is the power-master. But the portable device is still data-slave as the second version super hub system 88 is the data-master.

The following is an example showing the operation of the second version super hub system 88 in terms of power routing and data communication/transfer under different scenarios. In this example, the second port 24s of the second version super hub system 88 is connected to a modules docking hub 60s. The second version super hub system 88 starts its operation by detecting if there are any electronic products connected to the first port 22s or the third port 26s. If no electronic products are connected to the two ports, then the second version super hub system control unit 86 acts as both power-master and data-master. The modules docking hub 60s and all the modules 58s therein are power-slave and data-slave. However, if a battery module is coupled to the modules docking hub 60s, then the modules docking hub 60s is power-master and data-slave and the second version super hub system control unit 86 is power-slave and data-master accordingly. If an electronic device that always acts as a master (such as a desktop or a laptop computer) is connected to the first port 22s or the third port 26s, then this device is both power-master and data-master. Consequently, the second version super hub system control unit 86 of the second version super hub system 88 is data-slave and the internal battery/the modules docking hub 60s of second version super hub system 88 is power-slave. If a power supply is connected to the first port 22s or the third port 26s, then the power supply is power-master and the second version super hub system control unit 86 remains data-master. Consequently, the internal battery of the second version super hub system 88 is power-slave. If an electronic accessory is connected to the first port 22s or the third port 26s, then the second version super hub system control unit 86 remains as both power-master and data-master if the modules docking hub 60s has no battery module therein. If an electronic accessory is connected to the first port 22s or the third port 26s and a battery module is coupled to the modules docking hub 60s, then the second version super hub system control unit 86 is data-master and the modules docking hub 60s is power-master.

The second version super hub system 88 can also operate according to another exemplary embodiment of the present invention. In this embodiment, the first port 22s and the second port 24s are connected to a portable device and a modules docking hub 60s. The portable device usually includes at least one rechargeable battery within the device. The second version super hub system 88 draws the power from its own internal battery or the modules docking hub 60s with a battery module therein. The second version super hub system control unit 86 of the second version super hub system 88 acts as data-master. If the modules docking hub 60s has no battery module therein and the internal battery of the second version super hub system 88 is used up or the battery level of the internal battery drops below a level (e.g. below 5%), the second version super hub system 88 will draw the power from the internal battery of the portable device. Then the portable device acts as power-master and data-slave (the second version super hub system control unit 86 is data-master). The third port 26s is left open for a connection to an external device. An external device is selected from a group consisting of master electronic devices, power supplies and electronic accessories. If the third port 26s of the second version super hub system 88 is connected to an electronic device that always acts as master (such as a desktop or a laptop computer), then this device is both power-master and data-master. Consequently, both the second version super hub system control unit 86 of the second version super hub system 88 and the portable device connected to the first port 22s are set as slave in terms of both power and data. If the third port 26s of the second version super hub system 88 is connected to a power supply, then the power supply is power-master and the second version super hub system control unit 86 of the second version super hub system 88 is the data-master. If the third port 26s of the second version super hub system 88 is connected to an electronic accessory, then the second version super hub system control unit 86 of the second version super hub system 88 is data-master and the modules docking hub 60s with a battery module therein or the internal battery of the second version super hub system 88 is power-master. If the modules docking hub 60s has no battery module therein and the internal battery of the second version super hub system 88 is used up or the battery level of the internal battery of the second version super hub system 88 drops below a level (e.g. below 5%), the second version super hub system 88 will draw the power from the internal battery of the portable device to supply power to the electronic accessory and the system. Then the portable device is both power-master and data-slave (the second version super hub system control unit 86 is data-master).

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the spine 18 extends at the upper surface from one end of the frame 16 to the opposite end of the frame 16 along the longitudinal axis of the frame 16 as described in the first embodiment (also applies to all the embodiments as stated above), but it is clear that another spine 18 can be added at the lower surface, in which the spine 18 extends at the lower surface from one end of the frame 16 to the opposite end of the frame 16 along the longitudinal axis. Also, the spine 18 can be a backbone with a shape (e.g. in curve and not in a straight line). Further, the number of docking spaces 22 can be varied. It can be any number of docking spaces 22. Also in the first embodiment (also applies to all the embodiments as stated above), the locking mechanism 20 is shared by two adjacent docking spaces 22. It is clear that different locking mechanism can be used. One docking space 22 can have its own locking mechanism. Further, the locking mechanism is further selected from a group consisting of rails, mechanical connector, pneumatic connector and magnetic connector. Moreover, each docking space 22 may further include at least a rail to facilitate attachment of the module. LCD or LED display showing graphic and/or words can be used as the display 30 configured to provide information regarding the status of the module receiving cradle 12 and the attached modules 14. Further, the data communication between the module receiving cradle 12 and the module(s) can be done through wirelessly (e.g. by Wi-Fi, or Bluetooth or any known wireless communication). In this case, the modules may be communicate with the module receiving cradle 12 even when they are not at the docking space 22.

In certain embodiment, the size of each of the docking spaces is either a predetermined standard size or a multiple of the predetermined standard size. In yet another embodiment, all the docking spaces have the predetermined standard size.

The internal battery 34 as described in the first embodiment (also applies to all the embodiments as stated above) can be any kind of electric battery that can provide electrical power to the module docking hub 10. Furthermore, it is clear that other kinds of power source can be used in lieu of the battery. For example, photoelectric cell with battery or capacitor, fuel cell or equivalent can also be used as long as it can supply electric power to the module docking hub 10.

It should also be noted that the number of external ports as described in the third embodiment (also applies to the fourth and fifth the embodiments as stated above) needs not be restricted to one or two. It can be any number of external ports. All the external ports can also be a micro-USB port or any other standard for ports. Also, any number of connectors, detectors, multiplexers and gateways can be used as long as it does not deviate from the intended purpose of the present invention.

Further, the threshold numbers (e.g. battery level that is less than 5%, charging the internal battery of the super hub system 20s till 100 mAh) in the preceding description shall be interpreted as illustrative only and not in a limiting sense. Therefore, the threshold numbers can be different from what is suggested in the preceding description. Furthermore, the ranking of the priority list in terms of data transfer and supplying power for the first version super hub system 42 and the second version super hub system 88 can be adjusted by users and/or manufactures.

What is claimed is:

1. A device for storing and selectively routing electric power and data to one of at least two parties, comprising:
    a) a frame;
    b) a power source integrated within said frame;
    c) at least one first external port disposed at said frame and configured to connect to an external electronic product to transfer power and/or data;
    d) a backbone disposed at said frame, wherein said backbone comprises a plurality of module connectors configured to connect to at least one module to transfer power and data;
    e) a plurality of docking spaces disposed adjacent to said backbone, wherein each said docking space is disposed adjacent to one of said module connectors; and
    f) a control unit disposed within said frame, drawing electric power from said power source, and connected to said first external port and said plurality of module connectors, wherein said at least two parties comprise said external electronic product and one of the plurality of modules, wherein said control unit comprises a non-transitory computer readable medium and is configured to process data between said non-transitional computer readable medium and said module and wherein said device is configured to selectively establish a connecting route for said power, under control of the control unit, and wherein the control unit is configured to route power to or from at least one of the at least two parties or route power from a power supply connected to the power connector to at least one of the two parties according to:
  a power output priority, being the priority of selecting any one of
    (i) a power supply connected to the device, or
    (ii) said power source integrated within said frame, or
    (iii) said external product, or
    (iv) one of said plurality of modules
    as a power master from any two or more of (i), (ii), (iii) and (iv); and
  a power input priority, being the priority of selecting any one of
    (v) said power source integrated within said frame where it is a rechargeable power source, or
    (vi) said external product, or
    (vii) one of said plurality of module connectors
    as a power slave from any two or more of (v), (vi) and (vii).

2. The device of claim 1 further comprises a wireless communication module disposed within said frame and connected to said control unit through an internal port and configured to further provide wireless data communication with said external electronic product and/or said module.

3. The device of claim 2, wherein said each docking space further comprises a locking mechanism configured to engage at a module locking mechanism of said module to allow said module to fixingly attach said storage device at one of said docking space.

4. The device of claim 3, wherein said locking mechanism is further shared by two adjacent docking spaces and is configured to allow two said modules fixingly attach to said storage device at said two adjacent docking spaces by engaging their respective module locking mechanisms to said locking mechanism simultaneously.

5. The device of claim 4, wherein said locking mechanism is selected from a group consisting of rails, pneumatic connector and magnetic connector.

6. The device of claim 4, wherein said locking mechanism further comprises a pin with a pin head at the edge of said frame.

7. The device of claim 1 further comprises a switch; wherein said switch is configured to establish connection between said power source to said control unit, wherein said power source is selected from the group consisting of a battery, a rechargeable battery, a photoelectric cell and a fuel cell.

8. The device of claim 1 further comprises a first version super hub system coupled to said at least one first external port and an internal port; said internal port further coupling to said plurality of module connectors through said control unit, said first version super hub system selectively choosing one of said at least one first external ports or said internal port as master.

9. The device of claim 8 further comprises a second internal port; said second internal port coupling to a wireless communication module disposed within said frame and connected to said control unit and configured to further provide wireless data communication with said external electronic product.

10. The device of claim 8, wherein said first version super hub system comprises:
  a) a hub comprising an upstream handler and at least one downstream handler, wherein said upstream handler is configured to connect said at least one downstream handler inside said hub;
  b) a switch system capable of establishing connecting routes between said at least one first external port or said internal port to said upstream handler or to each of said at least one downstream handler of said hub; and
  c) a controller configured to control said switch,
wherein each said connecting route transfers at least electric power and optionally data; wherein said controller is configured to control said switch to configure one of said at least one first external ports or said internal port as master by routing it to said upstream handler, and configure each remaining port as slave by routing each remaining port to one of said at least one downstream handler.

11. The device of claim 1 further comprises a second version super hub system coupled to said at least one first external port and an internal port; said internal port further coupling to said plurality of module connectors through said control unit, wherein said second version super hub system individually detects a master/slave status of said at least one first external port and said internal port and perform self-configuration to match said master/slave status of each said port.

12. The device of claim 11 further comprises a second internal port; said second internal port coupling to a wireless communication module disposed within said frame and connected to said control unit and configured to further provide wireless data communication with said external electronic product.

13. The device of claim 11, wherein said second version super hub system comprising: a) at least two gateways; each of said gateways has a first terminal and a second terminal; wherein said first terminal of each said gateway is connected to one of said at least one first external ports or said internal port; and b) a control system connected to said second terminal of each said gateway, wherein said control system is configured to control each said gateway to perform self-configuration to match said master/slave status of each said port and to establish connecting routes between each said port for transferring at least electric power and optionally data.

14. The device of claim 1, wherein said control unit is further configured to store said data in said non-transitional computer readable medium; and transfer said data to said external electronic product and said modules.

15. The device of claim 1, wherein said control unit is further configured to allow communications between said modules connected to said device.

16. The device of claim 1, wherein said at least one first external ports or said internal port are Universal Serial Bus (USB) ports, Lightning ports, Ethernet ports, or controller area network ports.

17. A device for storing and selectively routing electric power and data to one of at least two parties, comprising:
  a) a frame;
  b) a power source integrated within said frame;
  c) at least one first external port disposed at said frame and configured to connect to an external electronic product to transfer power and data;

d) a backbone disposed at said frame, wherein said backbone comprises a plurality of module connectors configured to connect to at least one module to transfer power and data;
e) a plurality of docking spaces disposed adjacent to said backbone, wherein each said docking space is disposed adjacent to one of said module connectors;
f) a power supply connector; and
g) a control unit disposed within said frame, drawing electric power from said power source, and connected to said first external port and said plurality of module connectors and said power supply connector, wherein said at least two parties comprise said external electronic product and one of the plurality of modules, wherein said control unit comprises a non-transitory computer readable medium and is configured to process data between said non-transitional computer readable medium and said module and wherein said device is configured to selectively establish a connecting route for said power, under control of the control unit, and wherein the control unit is configured to route power to or from at least one of the at least two parties or route power from a power supply connected to the power connector to at least one of the two parties according to:

a power output priority, being the priority of selecting any one of
  (i) a power supply connected to the device, or
  (ii) said power source integrated within said frame, or
  (iii) said external product, or
  (iv) one of said plurality of modules
  as a power master from any two or more of (i), (ii), (iii) and (iv); and a power input priority, being the priority of selecting any one of
  (v) said power source integrated within said frame where it is a rechargeable power source, or
  (vi) said external product, or
  (vii) one of said plurality of module connectors
  as a power slave from any two or more of (v), (vi) and (vii).

* * * * *